US009122679B1

(12) United States Patent
Yu et al.

(10) Patent No.: US 9,122,679 B1
(45) Date of Patent: Sep. 1, 2015

(54) METHOD AND SYSTEM FOR INFORMATION RETRIEVAL EFFECTIVENESS ESTIMATION IN E-DISCOVERY

(71) Applicant: Symantec Corporation, Mountain View, CA (US)

(72) Inventors: Shengke Yu, Cupertino, CA (US); Venkat Rangan, Los Altos Hills, CA (US)

(73) Assignee: Symantec Corporation, Mountain View, CA (US)

( * ) Notice: Subject to any disclaimer, the term of this patent is extended or adjusted under 35 U.S.C. 154(b) by 98 days.

(21) Appl. No.: 13/729,743

(22) Filed: Dec. 28, 2012

(51) Int. Cl.
*G06F 17/30* (2006.01)

(52) U.S. Cl.
CPC ................................ *G06F 17/30002* (2013.01)

(58) Field of Classification Search
USPC .................................................. 707/737, 688
See application file for complete search history.

(56) References Cited

U.S. PATENT DOCUMENTS

| 5,452,442 | A * | 9/1995 | Kephart | 714/38.1 |
|---|---|---|---|---|
| 8,533,194 | B1 * | 9/2013 | Ravid et al. | 707/737 |
| 2003/0105638 | A1 * | 6/2003 | Taira | 704/275 |
| 2007/0094171 | A1 * | 4/2007 | Burges et al. | 706/16 |
| 2009/0287672 | A1 * | 11/2009 | Chakrabarti et al. | 707/5 |
| 2012/0215784 | A1 * | 8/2012 | King et al. | 707/740 |
| 2012/0278336 | A1 | 11/2012 | Malik et al. | |

OTHER PUBLICATIONS

Herbert L. Roitblat, "Information Retrieval and eDiscovery," 2006, World Wide Web Address http://www.electronicdiscoveryinstitute.com/pubs/InformationRetrievalandeDiscovery.pdf.
Jan Puzicha, "Defensible Predictive Coding. DESI III Global E-Discovery/E-Disclosure Workshop: A Pre-Conference Workshop at the 12th International Conference on Artificial Intelligence and Law," (ICAIL 2009), World Wide Web Address http://www.law.pitt.edu/DESI3_Workshop/Papers/DESI_III._Recommind.pdf. (retrieved from https://web.archive.org/web/20130701203000/http://www.law.pitt.edu/DESI3_Workshop/Papers/DESI_III.Recommind.pdf on Feb. 10, 2015).
L. Brown et al., "Interval Estimation for a Binomial Proportion," Department of Statistics, Purdue University, West Lafayette, IN, Technical Report No. 99-19, Aug. 1999, pp. 1-23, World Wide Web Address http://www.stat.purdue.edu/~dasgupta/publications/tr99-19.pdf.
U.S. Appl. No. 13/843,501 for System and Method for Training Data Generation in Predictive Coding filed Mar. 15, 2013.
U.S. Appl. No. 13/474,602 for Enhancing Training of Predictive Coding Systems Through User Selected Text filed May 17, 2012.
U.S. Appl. No. 13/421,226 for Method and System for Selection of Most Effective Machine Learning Kernel From a Training Set of Documents filed Mar. 15, 2012.

* cited by examiner

*Primary Examiner* — Hung T Vy
(74) *Attorney, Agent, or Firm* — Lowenstein Sandler LLP

(57) ABSTRACT

A server computing system determines a plurality of statistics for a plurality of validation documents. The server computing system determines a plurality of statistics for a plurality of test documents. The number of test documents in the plurality of test documents is determined based on the plurality of statistics for the plurality of validation documents and the effectiveness measure of interest. The server computing system calculates an effectiveness of an information retrieval system on a corpus of documents based on the plurality of statistics for the plurality of test documents.

26 Claims, 6 Drawing Sheets

METHOD AND SYSTEM FOR INFORMATION RETRIEVAL EFFECTIVENESS ESTIMATION IN E-DISCOVERY

TECHNICAL FIELD

Embodiments of the present invention relate to electronic discovery, and more particularly, to a technique for estimation of information retrieval effectiveness in electronic discovery.

BACKGROUND

Reviewers that review data sets, for example, during electronic discovery (e-discovery), may encounter data sets that contain millions of electronic discovery documents. Each of the electronic discovery documents may need to be evaluated by the reviewers and a binary determination may be made of a class or category for the documents. Categories may include confidential, not confidential, relevant, not relevant, privileged, not privileged, responsive, not responsive, etc. Manually reviewing the millions of electronic discovery documents in a group, or corpus, of documents is impractical, expensive, and time consuming.

An information retrieval system can implement automated review of electronic discovery documents using predictive coding. Predictive coding using machine learning is a technique commonly implemented to automatically review and classify a large number of electronic discovery documents in a corpus of documents. Some approaches of machine learning can use Support Vector Machine (SVM) technology to analyze a subset of the corpus of documents, called a training set, and can apply the machine learning from the analysis to the remaining electronic discovery documents in the corpus. Some approaches can use multiple training sets for machine learning (e.g., incrementally enhanced training sets) and/or can perform more than one round of machine learning (train, validate, train, validate, . . . , train, validate, test, etc.).

An SVM can be based on the concept of decision hyperplanes that define decision boundaries. A decision hyperplane can separate documents based on their class memberships (e.g., confidential, not confidential, relevant, not relevant, privileged, not privileged, responsive, not responsive, etc.). For example, documents can be classified by drawing a hyperplane (e.g., line) that defines a class boundary. On a first side of the boundary, all documents belonging to a first class (e.g., confidential) lie and on a second side of the boundary, all documents belonging to a second class (e.g., not confidential) lie. After the training phase is completed, new documents that were not part of the training set can be automatically classified. Any unclassified document can be classified by determining which side of the boundary it falls on. If the document falls to the first side, it can be classified as belonging to the first group, and if the document falls to the second side, it can be classified as belonging to the second group.

Once the information retrieval system has implemented automated review of electronic discovery documents, the effectiveness of the information retrieval system should be evaluated to determine if the information retrieval system is effectively classifying unclassified documents.

A current solution determines the effectiveness of an information retrieval system at high human review cost, requiring a human reviewer to review a large number of the classified documents and determine whether the information retrieval system classified the classified documents correctly.

SUMMARY

An exemplary system may include a server computing system programmed to estimate the effectiveness of an information retrieval system in e-discovery. In one embodiment, the server computing system determines a plurality of statistics for a plurality of validation documents. In one embodiment, the server computing system determines a plurality of statistics for a plurality of test documents. In one embodiment, the number of test documents in the plurality of test documents is determined based on the plurality of statistics for the plurality of validation documents. In one embodiment, the server computing system calculates an effectiveness measure of an information retrieval system on a corpus of documents based on the plurality of statistics for the plurality of test documents.

In one embodiment, the server computing system calculates the effectiveness of an information retrieval system on a corpus of documents based on the plurality of statistics for the plurality of test documents by calculating a number of true positives in the corpus of documents based on the number of test documents in the plurality of test documents, a size of the corpus of documents, a predetermined confidence level, and the plurality of statistics for the plurality of test documents, calculating a number of false positives in the corpus of documents based on the number of test documents in the plurality of test documents, the size of the corpus of documents, the predetermined confidence level, and the plurality of statistics for the plurality of test documents, calculating a number of false negatives in the corpus of documents based on the number of test documents in the plurality of test documents, the size of the corpus of documents, the predetermined confidence level, and the plurality of statistics for the plurality of test documents, and calculating a plurality of effectiveness measures for the corpus of documents based on the number of true positives, the number of false positives, and the number of false negatives.

In one embodiment, the server computing system calculates the number of true positives for the corpus of documents using a true positive number formula $$\widehat{TP} = \left(\frac{tp}{n}\right) \times N,$$

with a $(1-\alpha) \times 100\%$ confidence interval defined by a formula $$\left[\left(\widehat{p01} - Z0\sqrt{\widehat{\text{var}}(\widehat{p01})}\right) \times N, \left(\widehat{p01} + Z0\sqrt{\widehat{\text{var}}(\widehat{p01})}\right) \times N\right],$$

wherein $$\widehat{p01} = \left(\frac{tp + Z2}{n + Z4}\right),$$

wherein $$\widehat{\text{var}}(\widehat{p01}) = \frac{p01(1 - p01)}{n + Z4} \times fpc,$$

wherein $$fpc = \frac{N - (n + Z4)}{N - 1},$$

wherein $Z0 = z_{1-\alpha/2}$, wherein $Z4 = (Z0)^2 = (z_{1-\alpha/2})^2$, wherein $$Z2 = \frac{Z4}{2} = \left(z_{1-\frac{\alpha}{2}}\right)^2 / 2,$$

wherein $z_{1-\alpha/2}$ is a $(1-\alpha/2)$ percentile of a standard normal distribution, wherein $\alpha$ is an error percentile, wherein $(1-\alpha) \times 100\%$ is the predetermined confidence level, wherein tp is a number of true positives in the plurality of test documents, wherein N is the size of the corpus of documents, wherein n is the number of test documents, wherein calculating the number of false positives comprises applying a false positive number formula $$\widehat{FP} = \left(\frac{fp}{n}\right) \times N,$$

with a $(1-\alpha) \times 100\%$ confidence interval defined by a formula $[(\widehat{p02} - Z0\sqrt{\widehat{var}(\widehat{p02})}) \times N, (\widehat{p02} + Z0\sqrt{\widehat{var}(\widehat{p02})}) \times N]$, wherein $$\widehat{p02} = \left(\frac{fp + Z2}{n + Z4}\right),$$

wherein $$\widehat{var}(\widehat{p02}) = \frac{\widehat{p02}(1 - \widehat{p02})}{n + Z4} \times fpc,$$

wherein fp is a number of false positives in the plurality of test documents, wherein calculating the number of false negatives comprises applying a false negative number formula $$\widehat{FN} = \left(\frac{fn}{n}\right) \times N,$$

with a $(1-\alpha) \times 100\%$ confidence interval defined by a formula $[(\widehat{p04} - Z0\sqrt{\widehat{var}(\widehat{p04})}) \times N, (\widehat{p04} + Z0\sqrt{\widehat{var}(\widehat{p04})}) \times N]$, wherein $$\widehat{p04} = \left(\frac{fn + Z2}{n + Z4}\right),$$

wherein $$\widehat{var}(\widehat{p04}) = \frac{\widehat{p04}(1 - \widehat{p04})}{n + Z4} \times fpc,$$

and wherein fn is a number of false negatives in the plurality of test documents.

In one embodiment, the plurality of effectiveness measures comprise at least one of: precision, recall, and F-measure, wherein the precision is calculated using a precision formula $$\widehat{precision} = \frac{1}{1 + \frac{\widehat{FP}}{\widehat{TP}}},$$

with a $(1-\alpha) \times 100\%$ precision confidence interval $$[\widehat{precision0} - Z0\sqrt{\widehat{var}(\widehat{precision0})}, \widehat{precision0} + Z0\sqrt{\widehat{var}(\widehat{precision0})}],$$

wherein $$\widehat{precision0} = \frac{1}{1 + \frac{\widehat{FP0}}{\widehat{TP0}}},$$

wherein $$\widehat{var}\,\widehat{precision0} = \frac{\widehat{var}(\widehat{FP0}) \times \widehat{TP0}^2 + \widehat{var}(\widehat{TP0}) \times \widehat{FP0}^2 - 2 \times \widehat{TP0} \times \widehat{FP0} \times cov(\widehat{TP0}, \widehat{FP0})}{(\widehat{TP0} + \widehat{FP0})^4},$$

wherein $\widehat{TP0} = \widehat{p01} \times N$, wherein $\widehat{FP0} = \widehat{p02} \times N$, wherein $$\widehat{var}(\widehat{TP0}) = N^2 \times \frac{\widehat{p01}(1 - \widehat{p01})}{n + Z4} \times fpc,$$

wherein $$\widehat{var}(\widehat{FP0}) = N^2 \times \frac{\widehat{p02}(1 - \widehat{p02})}{n + Z4} \times fpc,$$

wherein $$cov(\widehat{TP0}, \widehat{FP0}) = N^2 \times \left(-\frac{\widehat{p01} \times \widehat{p02}}{n + Z4} \times fpc\right),$$

wherein $$\widehat{p01} = \left(\frac{tp + Z2}{n + Z4}\right),$$

wherein $$\widehat{p02} = \left(\frac{fp + Z2}{n + Z4}\right),$$

wherein $$fpc = \frac{N - (n + Z4)}{N - 1},$$

wherein $Z0 = z_{1-\alpha/2}$, wherein $Z4 = (Z0)^2 = (z_{1-\alpha/2})^2$ wherein $$Z2 = \frac{Z4}{2} = \left(z_{1-\frac{\alpha}{2}}\right)^2 / 2,$$

wherein $z_{1-\alpha/2}$ is a $(1-\alpha/2)$ percentile of a standard normal distribution, wherein $\alpha$ is an error percentile, wherein $(1-\alpha) \times 100\%$ is the predetermined effectiveness confidence level, wherein tp is a number of true positives in the plurality of test documents, wherein fp is a number of false positives in the plurality of test documents, wherein N is the size of the corpus of documents, wherein n is the number of test documents, wherein the recall is calculated using a recall formula $$\widehat{recall} = \frac{1}{1 + \frac{\widehat{FN}}{\widehat{TP}}},$$

with a $(1-\alpha) \times 100\%$ recall confidence interval $[\widehat{recall0} - Z0\sqrt{\widehat{var}(\widehat{recall0})}, \widehat{recall0} + Z0\sqrt{\widehat{var}(\widehat{recall0})}]$ wherein $$\widehat{recall0} = \frac{1}{1 + \frac{\widehat{FN0}}{\widehat{TP0}}},$$

wherein $$\widehat{var}(\widehat{recall0}) = \frac{\widehat{var}(\widehat{FN0}) \times \widehat{TP0}^2 + \widehat{var}(\widehat{TP0}) \times \widehat{FN0}^2 - 2 \times \widehat{TP0} \times \widehat{FN0}^2 \times \text{cov}(\widehat{TP0}, \widehat{FN0})}{(\widehat{TP0} + \widehat{FN0})^4},$$

wherein $$\widehat{FN0} = \hat{p}04 \times N, \text{ wherein } \widehat{var}(\widehat{FN0}) = N^2 \times \frac{\hat{p}04(1 - \hat{p}04)}{n + Z4} \times fpc,$$

wherein $$\text{cov}(\widehat{TP0}, \widehat{FN0}) = N^2 \times \left(-\frac{\hat{p}01 \times \hat{p}04}{n + Z4} \times fpc\right),$$

wherein $$\hat{p}04 = \left(\frac{fn + Z2}{n + Z4}\right),$$

wherein fn is a number of false negatives in the plurality of test documents, wherein the F-measure is calculated using an F-measure formula $$\hat{F} = \frac{2}{\frac{1}{\hat{R}} + \frac{1}{\hat{P}}},$$

with a $(1-\alpha) \times 100\%$ F-measure confidence interval $[\widehat{F0} - Z0\sqrt{\widehat{var}(\widehat{F0})}, \widehat{F0} + Z0\sqrt{\widehat{var}(\widehat{F0})}]$, wherein $\hat{P} = \widehat{precision}$, wherein $\widehat{P0} = \widehat{precision0}$, wherein $\hat{R} = \widehat{recall}$, wherein $\widehat{R0} = \widehat{recall0}$, wherein $$\widehat{F0} = \frac{2}{\frac{1}{\widehat{R0}} + \frac{1}{\widehat{P0}}},$$

wherein $$\widehat{var}(\widehat{F0}) = (\widehat{F0})^2 \left(\frac{\widehat{var}\left(\frac{1}{\widehat{R0}} + \frac{1}{\widehat{P0}}\right)}{\left(\frac{1}{\widehat{R0}} + \frac{1}{\widehat{P0}}\right)^2}\right),$$

wherein $$\widehat{var}\left(\frac{1}{\widehat{R0}} + \frac{1}{\widehat{P0}}\right) = \left(\frac{1}{\widehat{R0}}\right)^2 \left(\frac{\widehat{var}(\widehat{R0})}{\widehat{R0}^2}\right) + \left(\frac{1}{\widehat{P0}}\right)^2 \left(\frac{\widehat{var}(\widehat{P0})}{\widehat{P0}^2}\right) + 2 \times \text{cov}\left(\frac{1}{\widehat{P0}}, \frac{1}{\widehat{R0}}\right),$$

and wherein $$\text{cov}\left(\frac{1}{\widehat{P0}}, \frac{1}{\widehat{R0}}\right) = \frac{fpc}{n + Z4} \times \frac{\hat{p}02 \times \hat{p}04}{(\hat{p}01)^3}.$$

In one embodiment, the server computing system determines the number of test documents based on the plurality of statistics for the plurality of validation documents and the effectiveness measure of interest, wherein determining the number of test documents comprises applying a formula using the plurality of statistics for the plurality of validation documents and the effectiveness measure of interest.

In one embodiment, when the effectiveness measure of interest is the F-measure, the formula for the number of test documents is $$n = \frac{(N - Z4) \times n0 - Z4 \times (Z4 - 1)}{N + n0 + Z4 - 1},$$

wherein $$n0 = \frac{4A}{B \times C} - Z4,$$

wherein $$A = \frac{\tilde{p}04 \times (1-\tilde{p}04) \times (\tilde{p}01)^2 + \tilde{p}01 \times (1-\tilde{p}01) \times (\tilde{p}04)^2 + \tilde{p}02 \times (1-\tilde{p}02) \times (\tilde{p}01)^2 + \tilde{p}01 \times (1-\tilde{p}01) \times (\tilde{p}02)^2}{(\tilde{p}01)^4} + \frac{2 \times (\tilde{p}01)^2 \times (\tilde{p}02)^2 + 2 \times (\tilde{p}01)^2 \times (\tilde{p}04)^2 + 2 \times \tilde{p}01 \times \tilde{p}02 \times \tilde{p}04}{(\tilde{p}01)^4},$$

wherein $$B = \left(\frac{\tilde{p}02}{\tilde{p}01} + \frac{\tilde{p}04}{\tilde{p}01} + 2\right)^4,$$

wherein $C = (W/(2 \times Z0))^2$, wherein $$\tilde{p}01 = \left(\frac{tp\_v + Z2}{n\_v + Z4}\right)$$

is a censer of a population true positive rate confidence interval, wherein $$\tilde{p}02 = \left(\frac{fp\_v + Z2}{n\_v + Z4}\right)$$

is a center of a population false positive rate confidence interval, wherein $$\tilde{p}04 = \left(\frac{fn\_v + Z2}{n\_v + Z4}\right)$$

is a center of a population false negative rate confidence interval, wherein $Z0 = z_{1-\alpha/2}$, wherein $Z4 = (Z0)^2 = (z_{1-\alpha/2})^2$, wherein $$Z2 = \frac{Z4}{2} = \left(z_{1-\frac{\alpha}{2}}\right)^2 / 2,$$

wherein $z_{1-\alpha/2}$ is a $(1-\alpha/2)$ percentile of a standard normal distribution, wherein $\alpha$ is an error percentile, wherein $(1-\alpha) \times 100\%$ is the predetermined effectiveness confidence level, wherein W is a confidence interval width of the effectiveness measure of interest, wherein tp_v is a number of true positives in the plurality of validation documents, wherein fp_v is a number of false positives in the plurality of validation documents, wherein fn_v is a number of false negatives in the plurality of validation documents, wherein N is the size of the corpus of documents, wherein n_v is a number of documents in the plurality of validation documents, wherein when the effectiveness measure of interest is the recall, the formula for the number of test documents is $$n = \frac{(N - Z4) \times n1 - Z4 \times (Z4 - 1)}{N + n1 + Z4 - 1},$$

wherein $$n1 = \frac{A1}{C} - Z4,$$

wherein $$A1 = \frac{\tilde{p}04 \times (1-\tilde{p}04) \times (\tilde{p}01)^2 + \tilde{p}01 \times (1-\tilde{p}01) \times (\tilde{p}04)^2 + 2 \times (\tilde{p}01)^2 \times (\tilde{p}04)^2}{(\tilde{p}01 + \tilde{p}04)^4},$$

wherein when the effectiveness measure of interest is the precision, the formula for the number of test documents is $$n = \frac{(N - Z4) \times n2 - Z4 \times (Z4 - 1)}{N + n2 + Z4 - 1},$$

wherein $$n2 = \frac{A2}{C} - Z4,$$

and wherein $$A2 = \frac{\tilde{p}02 \times (1-\tilde{p}02) \times (\tilde{p}01)^2 + \tilde{p}01 \times (1-\tilde{p}01) \times (\tilde{p}02)^2 + 2 \times (\tilde{p}01)^2 \times (\tilde{p}02)^2}{(\tilde{p}01 + \tilde{p}02)^4}.$$

In one embodiment, the server computing system determines the plurality of statistics for the plurality of test documents by obtaining a user classification for each of the plurality of test documents from a user, obtaining a system classification for each of the plurality of test documents from an information retrieval system, and calculating the plurality of statistics for the plurality of test documents based on the user classification for each of the plurality of test documents and the system classification for each of the plurality of test documents.

In one embodiment, the plurality of statistics for the plurality of test documents comprise at least one of: a number of documents that are true positives, a number of documents that are false positives, a number of documents that are true negatives, and a number of documents that are false negatives.

In one embodiment, the server computing system determines the plurality of statistics for the plurality of validation documents by obtaining a user classification for each of the plurality of validation documents from a user, obtaining a system classification for each of the plurality of validation documents from the information retrieval system, and calculating the plurality of statistics for the plurality of validation documents based on the user classification for each of the plurality of validation documents and the system classification for each of the plurality of validation documents.

In one embodiment, the plurality of statistics for the plurality of validation documents comprises at least one of: the number of documents that are true positives, the number of documents that are false positives, the number of documents that are true negatives, and the number of documents that are false negatives.

In one embodiment, the server computing system selects the plurality of validation documents. In one embodiment, the server computing system selects the plurality of validation documents by randomly splitting the corpus of documents into a plurality of sub corpora, wherein the plurality of sub-corpora comprise a training sub-corpus, a validation sub-corpus, and a test sub-corpus, and randomly selecting the plurality of validation documents from the validation sub-corpus of documents. In one embodiment, the server computing system selects the plurality of test documents. In one embodiment, the server computing system selects the plurality of test documents by randomly selecting the plurality of test documents from the test sub-corpus of documents.

In one embodiment, the number of validation documents in the plurality of validation documents is predetermined.

In additional embodiments, methods for performing the operations of the above described embodiments are also implemented. Additionally, in embodiments of the present invention, a non-transitory computer-readable storage medium stores methods for performing the operations of the above described embodiments.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Figure 1:
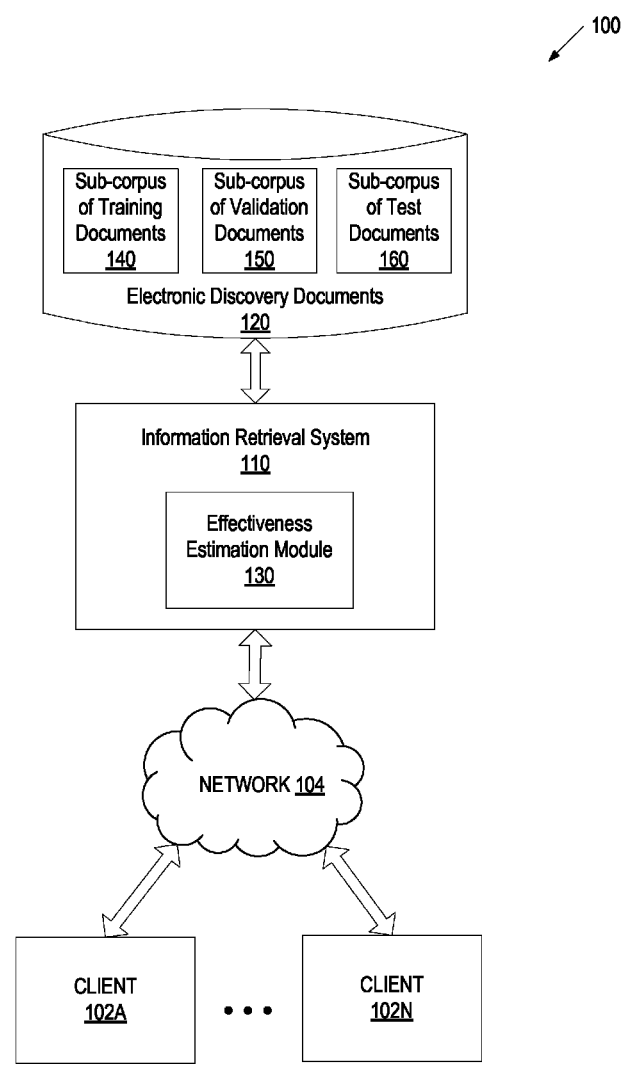
FIG. 1 illustrates exemplary system architecture, in accordance with various embodiments of the present invention.

Embodiments of the invention are directed to a method and system for estimation of information retrieval effectiveness in electronic discovery, from a small number of documents.

Reviewers or an administrator may have millions of electronic discovery documents to review in relation to electronic discovery. Automated coding using machine learning can be used to assist in reviewing and classifying a large number of electronic discovery documents (e.g., a corpus of documents). In order to classify a corpus of electronic discovery documents, a subset of the electronic discovery documents (e.g., 1000 to 10000 documents) may be selected as a set of training documents for the machine learning. The training documents may be reviewed by expert reviewers and categorized into one or more classes.

The training documents may be used to determine a classification model for the information retrieval system. Once the classification model has been determined, the effectiveness of the information retrieval system can be estimated for all the documents in the corpus of documents using another subset of the corpus of documents at very low human review cost. To estimate the effectiveness, a set of validation documents can be selected and one or more statistics are determined for the set of validation documents. In one embodiment, the statistics are determined based on an information retrieval system classification for each validation document and a user classification for each validation document.

Based on the statistics for the set of validation documents, a sample size is calculated for a predetermined effectiveness (e.g., F-measure) confidence level (e.g., 95%), a predetermined effectiveness (e.g., F-measure) confidence interval width (e.g., 0.2, or ±0.1), and the population size. The predetermined confidence level can define the percentage of interval estimates for a population parameter that are expected to include the true population parameter. In some embodiments, the effectiveness confidence level is a specific confidence level that defines the percentage of interval estimates for an information retrieval system (or its classification model) effectiveness that are expected to include the true effectiveness of the information retrieval system on a whole corpus of documents. The (effectiveness) confidence interval width can define the confidence interval width for the interval estimates. For example, an effectiveness confidence interval width of 0.2 at a 95% effectiveness confidence level defines that 95% of the interval estimates for the information retrieval system effectiveness are expected to include the true effectiveness of the information retrieval system on the whole corpus of documents, where all the confidence intervals are of width 0.2. Once the sample size has been calculated, a set of test documents are selected from the corpus of documents, where the number of documents in the set of test documents can be equal to the sample size. One or more statistics are determined for the set of test documents and the effectiveness of the information retrieval system for the corpus of documents is estimated based on the statistics for the set of test documents.

FIG. 1 illustrates exemplary system architecture 100 in which embodiments can be implemented. The system architecture 100 includes an information retrieval system 110, an electronic discovery documents data repository 120, and client machines 102A-102N connected to a network 104. Network 104 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

Information retrieval system 110 may be a rackmount server, a router computer, a personal computer, a portable digital assistant, a mobile phone, a laptop computer, a tablet computer, a camera, a video camera, a netbook, a desktop computer, a media center, or any combination of the above. In one embodiment, the information retrieval system 110 is deployed as a network appliance (e.g., a network router, hub, or managed switch).

Electronic discovery documents data repository 120 is a persistent storage that is capable of storing data that is collected from data sources. Examples of data sources can include, and are not limited to, desktop computers, laptop computers, handheld computers, server computers, gateway computers, mobile communications devices, cell phones, smart phones, or similar computing device. In some embodiments, electronic discovery documents data repository 120 might be a network-attached file server, while in other embodiments electronic discovery documents data repository 120 might be some other type of persistent storage such as an object-oriented database, a relational database, and so forth.

The data in the electronic discovery documents data repository 120 can include a corpus of electronic discovery documents that should be reviewed and classified. The corpus of electronic discovery documents stored in electronic documents data repository 120 can be divided into three sub-corpora of electronic discovery documents: a sub-corpus of training documents 140, a sub-corpus of validation documents 150, and a sub-corpus of test documents 160. In some embodiments, the sub-corpus of training documents 140 is a large percentage of the corpus of electronic discovery documents, the sub-corpus of validation documents 150 is a small percentage of the corpus of electronic discovery documents, and the sub-corpus of test documents 160 is a small percentage of the corpus of electronic discovery documents. For example, the sub-corpus of training documents 140 includes 70% of the documents in the corpus of electronic discovery documents, the sub-corpus of validation documents 150 includes 10% of the documents in the corpus of electronic discovery documents, and the sub-corpus of test documents 160 includes 20% of the documents in the corpus of electronic discovery documents. Examples of electronic discovery documents can include, and are not limited to, electronic discovery documents which have been divided into a set of training documents that have been selected from the training sub-corpus by the information retrieval system 110 or by an administrator (document reviewer, etc.), a set of validation documents that have been selected from the validation sub-corpus by the information retrieval system 110 or by the administrator, a set of test documents that have been selected from the test sub-corpus by the information retrieval system 110 or by the administrator, and the remainder of electronic discovery documents that should be classified, and any other electronically stored information that can be associated with electronic discovery documents, etc.

The client machines 102A-102N may be personal computers (PC), laptops, mobile phones, tablet computers, or any other computing devices. The client machines 102A-102N may run an operating system (OS) that manages hardware and software of the client machines 102A-102N. A user interface (not shown) may run on the client machines (e.g., on the OS of the client machines). The user interface may present documents from electronic discovery document data repository 120. The user interface can receive information from the client machines 102A-102N, such as a number of documents in electronic discovery document data repository 120 (e.g., a population size, also known as a corpus size), an effectiveness confidence level desired for the information retrieval system (e.g., F-measure, 95%), and an effectiveness confidence interval width desired for the information retrieval system (e.g., F-measure, 0.2). The client machines 102A-102N may also upload new electronic discovery documents to the information retrieval system 110 for storage and/or classification (e.g., in electronic discovery document data repository 120).

During operation of system 100, an information retrieval system 110 can determine the effectiveness of the information retrieval system 110 for the corpus of electronic discovery documents stored in electronic documents data repository 120 using a subset of the corpus of electronic discovery documents in electronic discovery documents repository 120.

The electronic discovery documents stored in electronic discovery documents data repository 120 can include training documents. The training documents can be a subset of the training sub-corpus 140 that is selected for machine learning of the information retrieval system 110. Using the selected training documents, an administrator or reviewer can classify each training document (e.g., confidential, not confidential, relevant, not relevant, privileged, not privileged, responsive, not responsive, etc.). Once the training documents are classified, a classification model can be determined for the information retrieval system 110.

The information retrieval system 110 can select a set of validation documents from the validation sub-corpus 150. The set of validation documents can be documents that are used to validate the classification model in the information retrieval system 110. The set of validation documents can be classified by the classification model (not shown) in the information retrieval system 110. The information retrieval system 110 can further present the set of validation documents to an administrator or reviewer via client device 102A-102N over network 104.

The information retrieval system 110 can cause a user interface to be presented to an administrator or reviewer via client device 102A-102N. The user interface can request one or more inputs from the administrator or reviewer on the client device 102A-102N over network 104, such as a population size, an effectiveness confidence level, and an effectiveness confidence interval width.

The information retrieval system 110 can receive, via a user interface on client device 102A-102N, a classification for each document in the set of validation documents from the administrator or reviewer on the client device 102A-102N.

In one embodiment, the information retrieval system 110 includes an effectiveness estimation module 130. The effectiveness estimation module 130 can determine one or more statistics for the set of validation documents based on the classification of each validation document from the information retrieval system 110 and the classification of each validation document from the administrator or reviewer.

The effectiveness estimation module 130 can determine a sample size for a number of documents to select as test documents to test the classification model of the information retrieval system 110. The sample size can be determined based on the one or more statistics determined for the set of validation documents and an effectiveness measure of interest. The effectiveness measure of interest can be F-measure, precision, or recall. In one embodiment, once the sample size has been determined, the effectiveness estimation module 130 can select a number of test documents equal to the sample size from the test sub-corpus 160 and store these documents as test documents. In an alternate embodiment, once the sample size has been determined, the information retrieval system 110 can select a number of test documents equal to the sample size from the test sub-corpus 160 and store these documents as test documents.

Once the test documents have been selected, the effectiveness estimation module 130 can present the set of test documents to an administrator or reviewer via client device 102A-102N over network 104. The effectiveness estimation module 130 can receive, via a user interface on client device 102A-102N, a classification for each document in the set of test documents from the administrator or reviewer. The effectiveness estimation module 130 can request a classification for each of the documents in the test documents from the information retrieval system 110.

The effectiveness estimation module 130 can determine one or more statistics for the set of test documents based on the classification for each document from the information retrieval system 110 and from the administrator or reviewer.

The effectiveness estimation module 130 can calculate an effectiveness of the information retrieval system 110 for the corpus of documents in electronic discovery documents data repository 120 based on the one or more statistics for the set of test documents.

Figure 2:
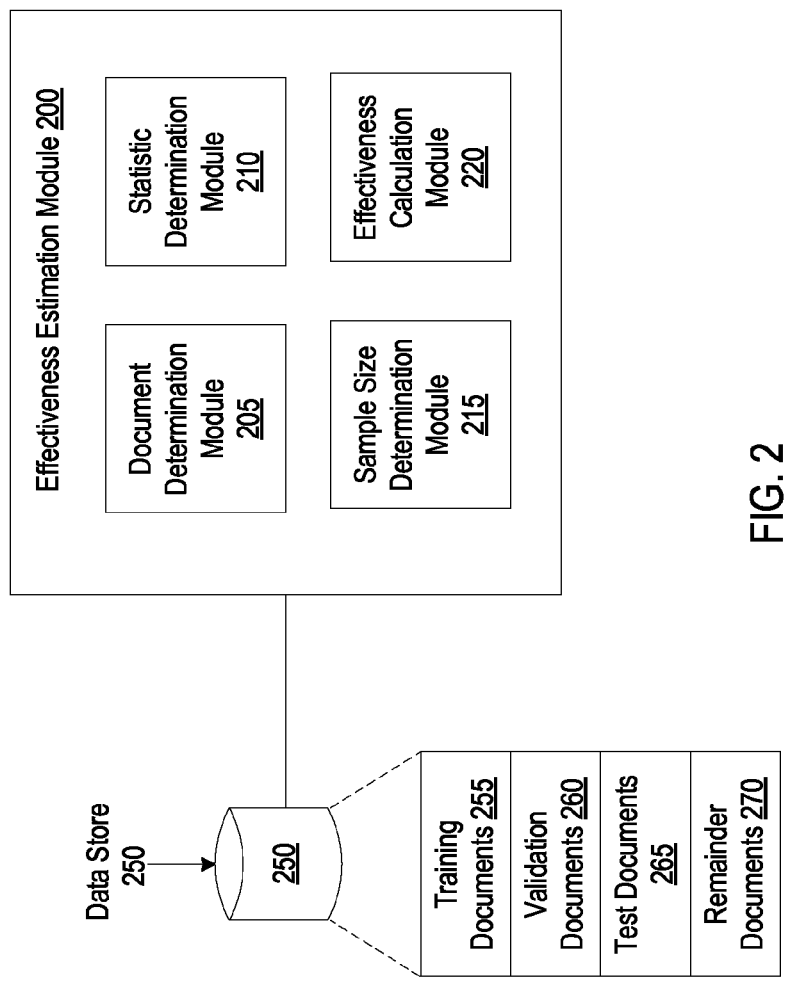
FIG. 2 is a block diagram of an effectiveness estimation module, in accordance with an embodiment.

FIG. 2 is a block diagram of an effectiveness estimation module 200, in accordance with one embodiment of the present invention. The effectiveness estimation module 200 includes a document determination module 205, a statistic determination module 210, a sample size determination module 215, and an effectiveness calculation module 220. Note that in alternative embodiments, the functionality of one or more of the document determination module 205, the statistic determination module 210, the sample size determination module 215, and the effectiveness calculation module 220 may be combined or divided.

In one embodiment, the document determination module 205 divides the corpus of documents by randomly splitting the corpus of documents stored in data store 250 into multiple sub-corpora of documents. In an alternate embodiment, the document determination module 205 divides the corpus of documents by using a selection criterion to select the documents in each sub-corpus of documents. In some embodiments, the document determination module 205 divides the corpus of documents into multiple sub-corpora without allowing any overlap in the documents, such that a document in one of the sub-corpora is not in any of the other sub-corpora. In one embodiment, the document determination module 205 divides the corpus of documents stored in data store 250 into three sub-corpora: a sub-corpus of training documents (not shown), a sub-corpus of validation documents (not shown), and a sub-corpus of test documents (not shown). Once the document determination module 205 selects training documents 255 from the training sub-corpus, validation documents 260 from the validation sub-corpus, and test documents 265 from the test sub-corpus, all the documents left in data store 250 are remainder documents 270.

The document determination module 205 can identify a set of validation documents by randomly selecting a predetermined number of documents from the validation sub-corpus in the data store 250. The documents in the set of validation documents are not part of training documents 255. In one embodiment, the predetermined number of documents is predefined (e.g., 2399). In an alternate embodiment, the predetermined number of documents is a percentage of the number of documents in the corpus of documents (e.g., 0.1%). In one embodiment, document determination module 205 can store the identified validation documents in validation documents 260.

The statistic determination module 210 can determine one or more statistics for the set of validation documents in validation documents 260. In one embodiment, the statistic determination module 210 determines the one or more statistics for the set of validation documents 260 by obtaining a classification for each validation document from a user, obtaining a classification for each validation document from a classification model (not shown), and calculating the one or more statistics based on the obtained classifications. In one embodiment, the classification model is a predictive coding engine that has been trained using the training documents in training documents 255. In one embodiment, the document determination module 205 identifies the set of training documents by selecting documents from the training sub-corpus in the data store 250.

In one embodiment, the statistic determination module 210 obtains the classification for each validation document from a user by presenting each validation document to the user via a user interface (not shown), receiving a classification for each validation document via the user interface, and storing the classifications in a data store, such as data store 250. In an alternate embodiment, the statistic determination module 210 obtains the classification for each validation document from a user by obtaining the classifications from a data store, such as data store 250.

In one embodiment, the statistic determination module 210 obtains the classification for each validation document from the classification model by sending a request to the classification model for the classifications of the validation documents in validation documents 260. In an alternate embodiment, the statistic determination module 210 obtains the classification for each validation document from a classification model by obtaining the classifications from a data store, such as data store 250. In another alternate embodiment, the statistic determination module 210 obtains the classification for each validation document from a classification model by submitting each validation document to the classification model and receiving a classification back from the classification model.

The statistic determination module 210 can calculate the one or more statistics based on the classification for each validation document from the user and on the classification for each validation document from the classification model. The one or more statistics can include a number of validation documents in validation documents 260 that are true positives (or the true positive rate in validation documents 260), a number of validation documents in validation documents 260 that are false positives (or the false positive rate in validation documents 260), a number of validation documents in validation documents 260 that are true negatives (or the true negative rate in validation documents 260), and/or a number of validation documents in validation documents 260 that are false negatives (or the false negative rate in validation documents 260). A document is a true positive if the classification of the document by the classification model is positive and the classification of the document by the user is positive. A document is a false positive if the classification of the document by the classification model is positive and the classification of the document by the user is negative. A document is a true negative if the classification of the document by the classification model is negative and the classification of the document by the user is negative. A document is a false negative if the classification of the document by the classification model is negative and the classification of the document by the user is positive. The statistic determination module 210 can determine that a validation document is a true positive, false positive, true negative or a false negative by comparing the classification from the user and the classification from the classification model for each validation document in validation documents 260.

Upon determining that a validation document is a true positive, the statistic determination module 210 can modify (e.g., increment) a count for the number of validation documents that are true positives. Upon determining that a validation document is a false positive, the statistic determination module 210 can modify (e.g., increment) a count for the number of validation documents that are false positives. Upon determining that a validation document is a true negative, the statistic determination module 210 can modify (e.g., increment) a count for the number of validation documents that are true negatives. Upon determining that a validation document is a false negative, the statistic determination module 210 can modify (e.g., increment) a count for the number of validation documents that are false negatives. The statistic determination module 210 can send the determined statistics to the sample size determination module 215.

The sample size determination module 215 can receive one or more statistics from the statistic determination module 210 and one or more additional inputs, such as a population size, an effectiveness confidence level, and an effectiveness confidence interval width. In one embodiment, the one or more additional inputs are received from a user. In an alternate embodiment, the one or more additional inputs are predetermined and received from a data store, such as data store 250. The sample size determination module 215 determines the sample size based on the one or more statistics, the effectiveness measure of interest (e.g., F-measure, precision, or recall), and the one or more additional inputs by applying a predefined formula to the one or more statistics and the one or more additional inputs. The sample size determination module 215 can send the determined sample size to the document determination module 205 and to the effectiveness calculation module 220.

The document determination module 205 can receive the sample size from the sample size determination module 215 and can identify a set of test documents from the corpus of documents stored in data store 250. In one embodiment, the document determination module 205 selects a number of documents equal to the sample size from the test sub-corpus in the data store 250. In one embodiment, the set of test documents is not part of training documents 255 or validation documents 260. In one embodiment, document determination module 205 stores the identified test documents in test documents 265.

The statistic determination module 210 can determine one or more statistics for the set of test documents in test documents 265. In one embodiment, the statistic determination module 210 determines the one or more statistics for the set of test documents 265 by obtaining a classification for each test document from a user, obtaining a classification for each test document from a classification model (not shown), and calculating the one or more statistics based on the obtained classifications. In one embodiment, the classification model is a predictive coding engine that has been trained using the training documents in training documents 255. In one embodiment, the document determination module 205 identifies the set of training documents by selecting documents from the training sub-corpus in the data store 250.

In one embodiment, the statistic determination module 210 obtains the classification for each test document from a user by presenting each test document to the user via a user interface (not shown), receiving a classification for each test document via the user interface, and storing the classifications in a data store, such as data store 250. In an alternate embodiment, the statistic determination module 210 obtains the classification for each test document from a user by obtaining the classifications from a data store, such as data store 250.

In one embodiment, the statistic determination module 210 obtains the classification for each test document from a classification model by sending a request to the classification model for the classifications of the test documents in test documents 265. In an alternate embodiment, the statistic determination module 210 obtains the classification for each test document from a classification model by obtaining the classifications from a data store, such as data store 250. In another alternate embodiment, the statistic determination module 210 obtains the classification for each test document from a classification model by submitting each test document to the classification model and receiving a classification back from the classification model.

The statistic determination module 210 can calculate the one or more statistics based on the classification for each test document from the user and on the classification for each test document from the classification model. The one or more statistics can include a number of test documents in test documents 265 that are true positives (or the true positive rate in test documents 265), a number of test documents in test documents 265 that are false positives (or the false positive rate in test documents 265), a number of test documents in test documents 265 that are true negatives (or the true negative rate in test documents 265), and/or a number of test documents in test documents 265 that are false negatives (or the false negative rate in test documents 265). The statistic determination module 210 can determine that a test document is a true positive, false positive, true negative or a false negative by comparing the classification from the user and the classification from the classification model for each test document in test documents 265.

Upon determining that a test document is a true positive, the statistic determination module 210 can modify (e.g., increment) a count for the number of test documents that are true positives. Upon determining that a test document is a false positive, the statistic determination module 210 can modify (e.g., increment) a count for the number of test documents that are false positives. Upon determining that a test document is a true negative, the statistic determination module 210 can modify (e.g., increment) a count for the number of test documents that are true negatives. Upon determining that a test document is a false negative, the statistic determination module 210 can modify (e.g., increment) a count for the number of test documents that are false negatives. The statistic determination module 210 can send the determined statistics to the effectiveness calculation module 220.

The effectiveness calculation module 220 can receive one or more statistics from the statistic determination module 210, the sample size from sample size determination module 215, and one or more additional inputs, such as a population size, an effectiveness confidence level, and an effectiveness confidence interval width. In one embodiment, the effectiveness calculation module 220 receives the one or more additional inputs from a user. In an alternate embodiment, the effectiveness calculation module 220 receives the one or more additional inputs from a data store, such as data store 250. The effectiveness calculation module 220 can calculate an effectiveness of an information retrieval system for the corpus of documents in data store 250 based on the received statistics for the test documents in test documents 265. In one embodiment, the effectiveness of the information retrieval system defines how effective the information retrieval system (e.g., the classification model in the information retrieval system) will be in correctly classifying the documents in the corpus of documents. In one embodiment, the effectiveness calculation module 220 can estimate the effectiveness for a corpus of documents that includes all documents in data store 250.

In one embodiment, the effectiveness calculation module 220 can calculate an estimate of the effectiveness of the information retrieval system for the corpus of documents using the one or more statistics, the sample size, and the one or more additional inputs by applying a predefined effectiveness formula to the one or more statistics, sample size, and the one or more additional inputs. In one embodiment, the effectiveness calculation module 220 can calculate an estimate of the effectiveness by calculating an estimate of the precision, the recall, and the F-measure for the information retrieval system. The precision for the information retrieval system can be a measure of the fraction of the classification model-predicted positive documents that are actually positive (i.e., the fraction of the classification model-classified positive documents that are user-classified positives). The recall for the information retrieval system can be a measure of the fraction of the actually positive documents that are classification model-predicted positives (i.e., the fraction of the user-classified positive documents that are classification model-classified positives). The F-measure for the information retrieval system can be a harmonic mean of the precision and recall.

Figure 3:
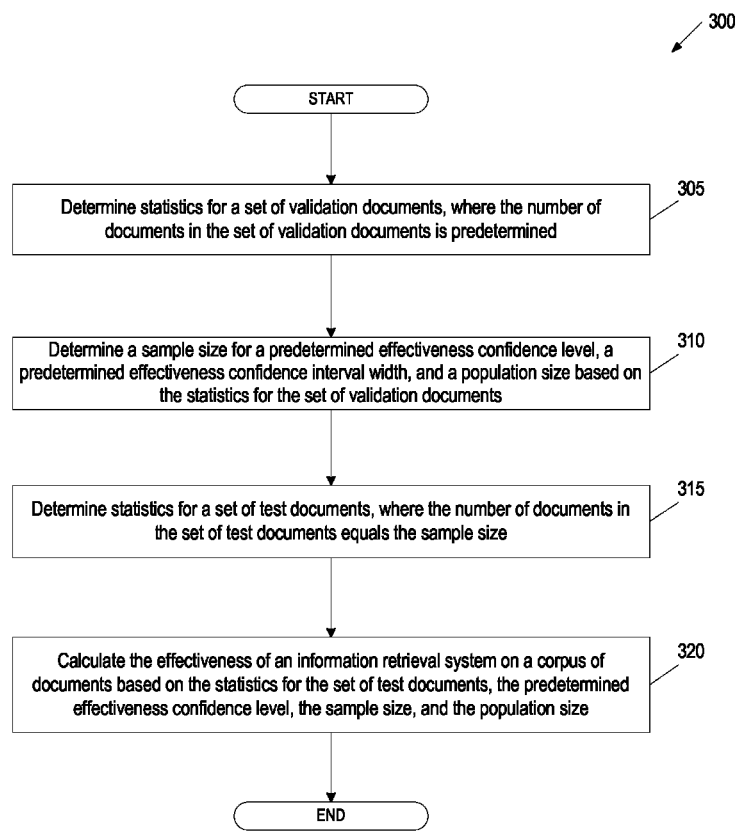
FIG. 3 is a flow diagram illustrating an embodiment for a method of estimating the effectiveness of an information retrieval system in e-discovery, in accordance with an embodiment.

FIG. 3 is a flow diagram of an embodiment of a method 300 for estimating the effectiveness of an information retrieval system in e-discovery. The method 300 is performed by processing logic that may comprise hardware (circuitry, dedicated logic, etc.), software (such as is run on a general purpose computer system or a dedicated machine), or a combination of both. In one embodiment, the method 300 is performed by the information retrieval system 110 of FIG. 1. The method 300 may be performed by an effectiveness estimation module 130 running on the information retrieval system 110 or another machine.

At block 305, processing logic determines one or more statistics for a set of validation documents. The number of documents in the set of validation documents can be predetermined. In one embodiment, the predetermined number of documents that are selected as validation documents is predefined (e.g., 2399). In an alternate embodiment, the predetermined number of documents that are selected as validation documents is a percentage of the number of documents in a corpus of documents (e.g., 0.1%). The set of validation documents can be selected for validating a classification model in an information retrieval system. In one embodiment, the classification model is a predictive coding engine. In an alternate embodiment, the classification model is another type of classifier for the information retrieval system as known in the art. One embodiment of determining one or more statistics for a set of validation documents is described in greater detail below in conjunction with FIG. 4.

At block 310, processing logic determines a sample size for a predetermined effectiveness confidence level, a predetermined effectiveness confidence interval width, and a population size based on the statistics for the set of validation documents. In one embodiment, the predetermined effectiveness confidence level, the predetermined effectiveness confidence interval width, and the population size are received from a user. In alternate embodiments, one or more of the predetermined effectiveness confidence level, the predetermined effectiveness confidence interval width, and the population size are predefined (e.g., a predetermined F-measure confidence level of 95%, a predetermined F-measure confidence interval width of 0.2, and a population size of 3,000,000, etc.). Processing logic determines the sample size for a predetermined effectiveness confidence level, a predetermined effectiveness confidence interval width, and a population size, based on the one or more statistics for the set of validation documents by applying a predefined formula. In one embodiment, in the sample size formulas, the one or more statistics for the set of validation documents are the center of the population true positive rate confidence interval, the center of the population false positive rate confidence interval, and the center of the population false negative rate confidence interval. In an alternate embodiment, in the sample size formulas, the one or more statistics for the set of validation documents can be any point in the population true positive rate confidence interval, any point in the population false positive rate confidence interval, and any point in the population false negative rate confidence interval; therefore in this embodiment, different sample sizes can be calculated using combinations of different true positive rates, false positive rates, and false negative rates, and the largest sample size among them can be selected as the sample size determined.

In some embodiments, the formula used to calculate a sample size is based on an effectiveness measure of interest. The effectiveness measure of interest can be the F-measure, the precision, the recall, etc.

In one embodiment, when the effectiveness measure of interest is the F-measure, the formula for calculating a sample size, n, is:

$$n = \frac{(N - Z4) \times n0 - Z4 \times (Z4 - 1)}{N + n0 + Z4 - 1},$$

where $$n0 = \frac{4A}{B \times C} - Z4,$$

$$A \stackrel{def}{=} \frac{\tilde{p}04 \times (1 - \tilde{p}04) \times (\tilde{p}01)^2 + \tilde{p}01 \times (1 - \tilde{p}01) \times (\tilde{p}04)^2 + \tilde{p}02 \times (1 - \tilde{p}02) \times (\tilde{p}01)^2 + \tilde{p}01 \times (1 - \tilde{p}01) \times (\tilde{p}02)^2}{(\tilde{p}01)^4} + \frac{2 \times (\tilde{p}01)^2 \times (\tilde{p}02)^2 + 2 \times (\tilde{p}01)^2 \times (\tilde{p}04)^2 + 2 \times \tilde{p}01 \times \tilde{p}02 \times \tilde{p}04}{(\tilde{p}01)^4},$$

$$B \stackrel{def}{=} \left(\frac{\tilde{p}02}{\tilde{p}01} + \frac{\tilde{p}04}{\tilde{p}01} + 2\right)^4,$$

$$C \stackrel{def}{=} (W/(2 \times Z0))^2,$$

$$\tilde{p}01 \stackrel{def}{=} \left(\frac{tp\_v + Z2}{n\_v + Z4}\right)$$

is the center of the population true positive rate confidence interval, $$\tilde{p}02 \stackrel{def}{=} \left(\frac{fp\_v + Z2}{n\_v + Z4}\right)$$

is the center of the population false positive rate confidence interval, $$\tilde{p}04 \stackrel{def}{=} \left(\frac{fn\_v + Z2}{n\_v + Z4}\right)$$

is the center of the population false negative rate confidence interval, $$Z0 \stackrel{def}{=} z_{1-\alpha/2},$$

-continued $$Z4 \stackrel{def}{=} (Z0)^2 = (z_{1-\alpha/2})^2,$$

$$Z2 \stackrel{def}{=} \frac{Z4}{2} = \left(z_{1-\frac{\alpha}{2}}\right)^2 / 2,$$

$z_{1-\alpha/2}$ is the $(1-\alpha/2)$ percentile of a standard normal distribution, α is the error percentile, (1−α)×100% is the predetermined effectiveness confidence level, W is a confidence interval width of the effectiveness measure of interest, tp_v is the number of true positives in the set of validation documents, fp_v is the number of false positives in the set of validation documents, fn_v is the number of false negatives in the set of validation documents, N is the size of the corpus of documents, and n_v is the number of documents in the set of validation documents.

In such an embodiment, the "hat notation," as in $\widehat{p01}$ indicates that the variable $\widehat{p01}$ is a point estimate (with the Agresti-Coull adjustment) of the variable (population parameter) p01.

In this embodiment, when the effectiveness measure of interest is the recall, the formula for calculating a sample size, n, is:

$$n = \frac{(N - Z4) \times n1 - Z4 \times (Z4 - 1)}{N + n1 + Z4 - 1},$$

where $$n1 = \frac{A1}{C} - Z4,$$

and $$A1 \stackrel{def}{=} \frac{\widehat{p04}(1-\widehat{p04}) \times (\widehat{p01})^2 + \widehat{p01} \times (1-\widehat{p01}) \times (\widehat{p04})^2 + 2 \times (\widehat{p01})^2 \times (\widehat{p04})^2}{(\widehat{p01} + \widehat{p04})^4}.$$

In this embodiment, when the effectiveness measure of interest is the precision, the formula for calculating a sample size, n, is:

$$n = \frac{(N - Z4) \times n2 - Z4 \times (Z4 - 1)}{N + n2 + Z4 - 1},$$

where $$n2 = \frac{A2}{C} - Z4,$$

and $$A2 \stackrel{def}{=} \frac{\widehat{p02} \times (1-\widehat{p02}) \times (\widehat{p01})^2 + \widehat{p01} \times (1-\widehat{p01}) \times (\widehat{p02})^2 + 2 \times (\widehat{p01})^2 \times (\widehat{p02})^2}{(\widehat{p01} + \widehat{p02})^4}.$$

For example, a set of validation documents includes 2399 documents, with 210 documents that are true positives, 40 documents that are false positives, 30 documents that are false negatives, and 2119 documents that are true negatives. The user inputs a 95% F-measure confidence level with 2.5% margin of error (i.e., with 5% confidence interval width), and a population size for the corpus of documents of 3,200,000. In this example, W=5%, 1−α=95%, α=5%, so 1−α/2=0.975, Z0=$z_{1-\alpha/2}$=1.96, Z4=3.84≈4, Z2=1.92≈2, n_v=2399, tp_v=210, fp_v=40, fn_v=30, and tn_v=2119, which would calculate a sample size of 4300.

At block 315, processing logic determines one or more statistics for a set of test documents. The number of documents in the set of test documents can be equal to the sample size. The set of test documents can be a subset of documents in the test sub-corpus of a corpus of electronic discovery documents. One embodiment of determining one or more statistics for a set of test documents is described in greater detail below in conjunction with FIG. 4.

At block 320, processing logic calculates the effectiveness of an information retrieval system for a corpus of documents based on the one or more statistics for the set of test documents, the predetermined effectiveness confidence level, the sample size, and the population size. The effectiveness of an information retrieval system for the corpus of documents can be measured in terms of the population parameters precision, recall, and F-measure. One embodiment of calculating the effectiveness of the information retrieval system for the corpus of documents based on the one or more statistics for the set of test documents, the predetermined effectiveness confidence level, the sample size, and the population size, is described in greater detail below in conjunction with FIG. 5.

Figure 4:
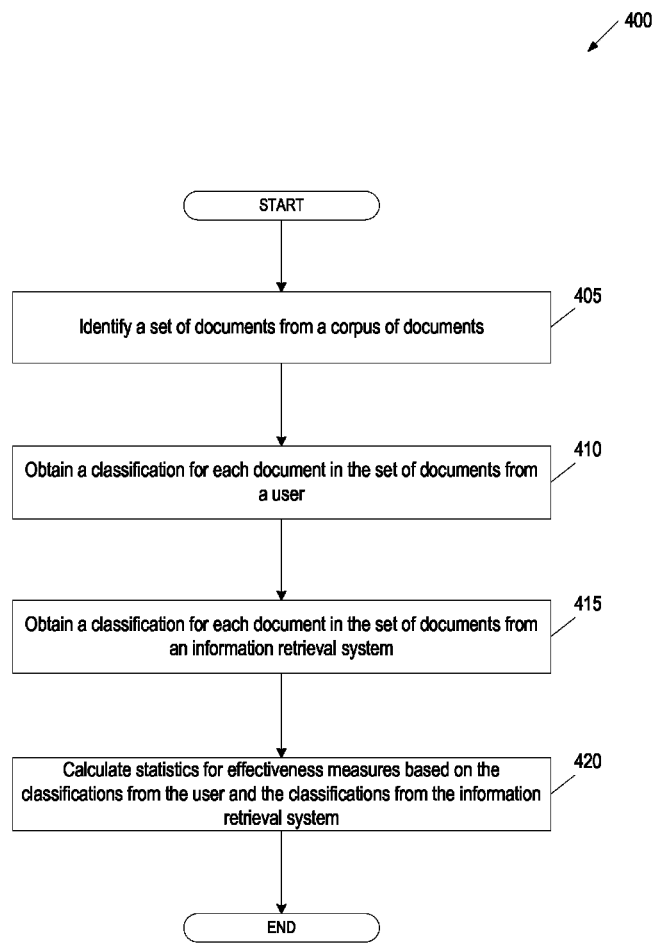
FIG. 4 is a flow diagram illustrating an embodiment for a method of determining statistics for a set of documents, in accordance with an embodiment.

FIG. 4 is a flow diagram of an embodiment of a method 400 for determining statistics for a set of documents. The method 400 is performed by processing logic that may comprise hardware (circuitry, dedicated logic, etc.), software (such as is run on a general purpose computer system or a dedicated machine), or a combination of both. In one embodiment, the method 400 is performed by the information retrieval system 110 of FIG. 1. The method 400 may be performed by an effectiveness estimation module 130 running on the information retrieval system 110 or another machine.

At block 405, processing logic identifies a set of documents from a corpus of documents. In one embodiment, processing logic identifies the set of documents by selecting a predetermined number of electronic documents from the corpus of documents. In one embodiment, the corpus of documents includes electronic documents used for training an information retrieval system, validating an information retrieval system, and/or testing an information retrieval system. In one embodiment, the corpus of documents can be randomly split into three sub-corpora of documents: a sub-corpus of training documents, a sub-corpus of validation documents, and a sub-corpus of test documents. In this embodiment, the documents identified for the set of validation documents can be randomly selected from the validation sub-corpus of documents, and the documents identified for the set of test documents can be randomly selected from the test sub-corpus of documents.

At block 410, processing logic obtains a classification for each document in the set of documents from a user. In one embodiment, processing logic obtains the classification for each document from a user by presenting each document to the user via a user interface and receiving a classification for each document via the user interface. In an alternate embodiment, processing logic obtains the classification for each document from a user by obtaining the classifications from a data store.

At block 415, processing logic obtains a classification for each document in the set of documents from an information retrieval system. In one embodiment, processing logic obtains the classification for each document from an information retrieval system by sending a classification request to the information retrieval system. In an alternate embodiment, processing logic obtains the classification for each document from an information retrieval system by obtaining the classifications from a data store. In another alternate embodiment, processing logic obtains the classification for each document from an information retrieval system by submitting each document to the information retrieval system and receiving a classification back for each document from the information retrieval system. In one embodiment, the information retrieval system is a predictive coding system that has been trained using a set of training documents from the corpus of documents. In one embodiment, processing logic identifies a set of test documents from the test sub-corpus of documents.

At block 420, processing logic calculates statistics for effectiveness measures based on the classifications from the user and the classifications from the information retrieval system. The one or more statistics can include a number of documents in the set of documents that are true positives (or the true positive rate in the set of documents), a number of documents in the set of documents that are false positives (or the false positive rate in the set of documents), a number of documents in the set of documents that are true negatives (or the true negative rate in the set of documents), and/or a number of documents in the set of documents that are false negatives (or the false negative rate in the set of documents). Processing logic can determine that a document is a true positive, false positive, true negative, or a false negative by comparing the classification from the user and the classification from the information retrieval system for the document. Processing logic can determine that a document is a true positive if the classification of the document by the classification model is positive and the classification of the document by the user is positive. Processing logic can determine that a document is a false positive if the classification of the document by the classification model is positive and the classification of the document by the user is negative. Processing logic can determine that a document is a true negative if the classification of the document by the classification model is negative and the classification of the document by the user is negative. Processing logic can determine that a document is a false negative if the classification of the document by the classification model is negative and the classification of the document by the user is positive.

Upon determining that a document is a true positive, processing logic can modify (e.g., increment) a count for the number of documents in the set of documents that are true positives. Upon determining that a document is a false positive, processing logic can modify (e.g., increment) a count for the number of documents in the set of documents that are false positives. Upon determining that a document is a true negative, processing logic can modify (e.g., increment) a count for the number of documents in the set of documents that are true negatives. Upon determining that a document is a false negative, processing logic can modify (e.g., increment) a count for the number of documents in the set of documents that are false negatives.

Figure 5:
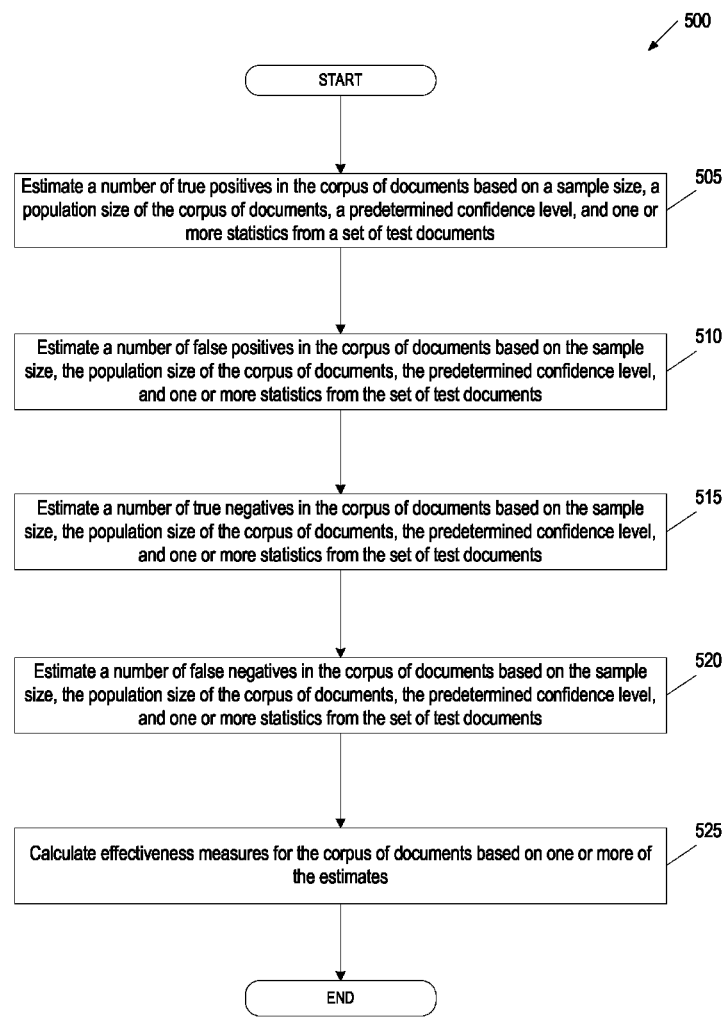
FIG. 5 is a flow diagram illustrating an embodiment for a method of calculating the effectiveness measures for a corpus of documents, in accordance with an embodiment.

FIG. 5 is a flow diagram of an embodiment of a method 500 for calculating the effectiveness measures for a corpus of documents. The method 500 is performed by processing logic that may comprise hardware (circuitry, dedicated logic, etc.), software (such as is run on a general purpose computer system or a dedicated machine), or a combination of both. In one embodiment, the method 500 is performed by the information retrieval system 110 of FIG. 1. The method 500 may be performed by an effectiveness estimation module 130 running on the information retrieval system 110 or another machine.

At block 505, processing logic estimates a number of true positives for the corpus of documents based on a sample size, the population size of the corpus of documents, a predetermined confidence level, and one or more statistics from a set of test documents. The one or more statistics can include the number of true positives in the set of test documents (or the true positive rate in the set of test documents), the number of false positives in the set of test documents (or the false positive rate in the set of test documents), the number of true negatives in the set of test documents (or the true negative rate in the set of test documents), and the number of false negatives in the set of test documents (or the false negative rate in the set of test documents). In one embodiment, processing logic estimates the number of true positives in the corpus of documents by using the sample size, the population size of the corpus of documents, the predetermined confidence level, and the number of true positives in the set of test documents in a formula. In one embodiment, the formula to estimate the number of true positives in the corpus of documents is:

$$\widehat{TP} = \left(\frac{tp}{n}\right) \times N,$$

with a $(1-\alpha)\times 100\%$ confidence interval $[(\widehat{p01} - Z0\sqrt{\widehat{\text{var}}(\widehat{p01})})\times N, (\widehat{p01} + Z0\sqrt{\widehat{\text{var}}(\widehat{p01})})\times N]$, where $$\widehat{p01} \stackrel{def}{=} \left(\frac{tp + Z2}{n + Z4}\right),$$

$$\widehat{\text{var}}(\widehat{p01}) = \frac{\widehat{p01}(1-\widehat{p01})}{n + Z4} \times fpc,$$

$$fpc \stackrel{def}{=} \frac{N - (n + Z4)}{N - 1},$$

$$Z0 \stackrel{def}{=} z_{1-\alpha/2},$$

$$Z4 \stackrel{def}{=} (Z0)^2 = (z_{1-\alpha/2})^2,$$

$$Z2 \stackrel{def}{=} \frac{Z4}{2} = \left(z_{1-\frac{\alpha}{2}}\right)^2/2,$$

$z_{1-\alpha/2}$ is the $(1-\alpha/2)$ percentile of a standard normal distribution, $\alpha$ is the error percentile, $(1-\alpha)\times 100\%$ is the predetermined confidence level, tp is the number of true positives in the set of test documents, N is the population size of the corpus of documents, and n is the sample size, which equals the number of documents in the set of test documents.

In such an embodiment, the "hat notation," as in $\widehat{TP}$ indicates that the variable $\widehat{TP}$ is a point estimate of the variable (population parameter) TP.

At block 510, processing logic estimates a number of false positives for the corpus of documents based on the sample size, the population size of the corpus of documents, the predetermined confidence level, and one or more statistics from a set of test documents. The one or more statistics can include the number of true positives in the set of test documents (or the true positive rate in the set of test documents), the number of false positives in the set of test documents (or the false positive rate in the set of test documents), the number of true negatives in the set of test documents (or the true negative rate in the set of test documents), and the number of false negatives in the set of test documents (or the false negative rate in the set of test documents). In one embodiment, processing logic estimates the number of false positives in the corpus of documents by using the sample size, the population size of the corpus of documents, the predetermined confidence level, and the number of false positives in the set of test documents in a formula. In one embodiment, the formula to estimate the number of false positives in the corpus of documents is:

$$\widehat{FP} = \left(\frac{fp}{n}\right) \times N,$$

with a $(1-\alpha) \times 100\%$ confidence interval $[(\widehat{p02} - Z0 \sqrt{\widehat{var}(\widehat{p02})}) \times N,$
$(\widehat{p02} + Z0\sqrt{\widehat{var}(\widehat{p02})}) \times N]$, where $$\widehat{p02} \stackrel{def}{=} \left(\frac{fp + Z2}{n + Z4}\right),$$

$$\widehat{var}(\widehat{p02}) = \frac{\widehat{p02}(1 - \widehat{p02})}{n + Z4} \times fpc,$$

$$fpc \stackrel{def}{=} \frac{N - (n + Z4)}{N - 1},$$

$$Z0 \stackrel{def}{=} z_{1-\alpha/2},$$

$$Z4 \stackrel{def}{=} (Z0)^2 = (z_{1-\alpha/2})^2,$$

$$Z2 \stackrel{def}{=} \frac{Z4}{2} = \left(z_{1-\frac{\alpha}{2}}\right)^2 / 2,$$

$z_{1-\alpha/2}$ is the $(1-\alpha/2)$ percentile of a standard normal distribution, $\alpha$ is the error percentile, $(1-\alpha) \times 100\%$ is the predetermined confidence level, fp is the number of false positives in the set of test documents, N is the population size of the corpus of documents, and n is the sample size, which equals the number of documents in the set of test documents.

In such an embodiment, the "hat notation," as in $\widehat{FP}$ indicates that the variable $\widehat{FP}$ is a point estimate of the variable (population parameter) FN.

At block 515, processing logic estimates a number of true negatives for the corpus of documents based on the sample size, the population size of the corpus of documents, the predetermined confidence level, and one or more statistics from a set of test documents. The one or more statistics can include the number of true positives in the set of test documents (or the true positive rate in the set of test documents), the number of false positives in the set of test documents (or the false positive rate in the set of test documents), the number of true negatives in the set of test documents (or the true negative rate in the set of test documents), and the number of false negatives in the set of test documents (or the false negative rate in the set of test documents). In one embodiment, processing logic estimates the number of true negatives in the corpus of documents by using the sample size, the population size of the corpus of documents, the predetermined confidence level, and the number of true negatives in the set of test documents in a formula. In one embodiment, the formula to estimate the number of true negatives in the corpus of documents is:

$$\widehat{TN} = \left(\frac{tn}{n}\right) \times N,$$

with a $(1-\alpha) \times 100\%$ confidence interval $[(\widehat{p03} - Z0 \sqrt{\widehat{var}(\widehat{p03})}) \times N,$
$(\widehat{p03} + Z0\sqrt{\widehat{var}(\widehat{p03})}) \times N]$, where $$\widehat{p03} \stackrel{def}{=} \left(\frac{tn + Z2}{n + Z4}\right),$$

$$\widehat{var}(\widehat{p03}) = \frac{\widehat{p03}(1 - \widehat{p03})}{n + Z4} \times fpc,$$

$$fpc \stackrel{def}{=} \frac{N - (n + Z4)}{N - 1},$$

$$Z0 \stackrel{def}{=} z_{1-\alpha/2},$$

$$Z4 \stackrel{def}{=} (Z0)^2 = (z_{1-\alpha/2})^2,$$

$$Z2 \stackrel{def}{=} \frac{Z4}{2} = \left(z_{1-\frac{\alpha}{2}}\right)^2 / 2,$$

$z_{1-\alpha/2}$ is the $(1-\alpha/2)$ percentile of a standard normal distribution, $\alpha$ is the error percentile, $(1-\alpha) \times 100\%$ is the predetermined confidence level, tn is the number of true negatives in the set of test documents, N is the population size of the corpus of documents, and n is the sample size, which equals the number of documents in the set of test documents.

In such an embodiment, the "hat notation," as in $\widehat{TN}$ indicates that the variable $\widehat{TN}$ is a point estimate of the variable (population parameter) TN.

At block 520, processing logic estimates a number of false negatives for the corpus of documents based on the sample size, the population size of the corpus of documents, the predetermined confidence level, and one or more statistics from a set of test documents. The one or more statistics can include the number of true positives in the set of test documents (or the true positive rate in the set of test documents), the number of false positives in the set of test documents (or the false positive rate in the set of test documents), the number of true negatives in the set of test documents (or the true negative rate in the set of test documents), and the number of false negatives in the set of test documents (or the false negative rate in the set of test documents). In one embodiment, processing logic estimates the number of false negatives in the corpus of documents by using the sample size, the population size of the corpus of documents, the predetermined confidence level, and the number of false negatives in the set of test documents in a formula. In one embodiment, the formula to estimate the number of false negatives in the corpus of documents is:

$$\widehat{FN} = \left(\frac{fn}{n}\right) \times N,$$

with a $(1-\alpha) \times 100\%$ confidence interval
$[(\widehat{p04} - Z0\sqrt{\widehat{var}(\widehat{p04})}) \times N, \quad (\widehat{p04} + Z0\sqrt{\widehat{var}(\widehat{p04})}) \times N]$, where $$\widehat{p04} \stackrel{def}{=} \left(\frac{fn + Z2}{n + Z4}\right),$$

$$\widehat{var}(\widehat{p04}) = \frac{\widehat{p04}(1 - \widehat{p04})}{n + Z4} \times fpc,$$

$$fpc \stackrel{def}{=} \frac{N - (n + Z4)}{N - 1},$$

$z_{1-\alpha/2}$ is the $(1-\alpha/2)$ percentile of a standard normal distribution,
$\alpha$ is the error percentile,
$(1-\alpha) \times 100\%$ is the predetermined confidence level,
fn is the number of false negatives in the set of test documents,
N is the population size of the corpus of documents, and
n is the sample size, which equals the number of documents in the set of test documents.

In such an embodiment, the "hat notation," as in $\widehat{FN}$ indicates that the variable $\widehat{FN}$ is a point estimate of the variable (population parameter) FN.

At block 525, processing logic calculates effectiveness measures for the corpus of documents based on one or more of the estimates. In one embodiment, the effectiveness measures are precision, recall, and F-measure. The precision of the classification model can be a measure of the fraction of the classification model-predicted positive documents that are actually positive. Precision can be defined as:

precision=TP/(TP+FP), where

TP is the number of true positives in the corpus of documents, and
FP is the number of false positives in the corpus of documents.

Processing logic can use the estimate for the number of true positives in the corpus of documents (interval estimate and point estimate for TP) and the estimate for the number of false positives in the corpus of documents (interval estimate and point estimate for FP) to estimate the precision on the corpus of documents. The estimates for TP and FP can be derived from the number of true positives in the set of test documents and the number of false positives in the set of test documents. In one embodiment, the precision is estimated using the formula:

$$\widehat{precision} = \frac{1}{1 + \frac{\widehat{FP}}{\widehat{TP}}},$$

with a $(1-\alpha) \times 100\%$ precision confidence interval $[\widehat{precision0} - Z0\sqrt{\widehat{var}(\widehat{precision0})}, \quad \widehat{precision0} + Z0\sqrt{\widehat{var}(\widehat{precision0})}]$, where $$\widehat{precision0} = \frac{1}{1 + \frac{\widehat{FP0}}{\widehat{TP0}}},$$

and with the delta method, $$\widehat{var}(\widehat{precision0}) = \frac{\widehat{var}(\widehat{FP0}) \times \widehat{TP0}^2 + \widehat{var}(\widehat{TP0}) \times \widehat{FP0}^2 - 2 \times \widehat{TP0} \times \widehat{FP0} \times cov(\widehat{TP0}, \widehat{FP0})}{(\widehat{TP0}, \widehat{FP0})^4},$$

where $$\widehat{TP0} = \widehat{p01} \times N,$$

$$\widehat{FP0} = \widehat{p02} \times N,$$

$$\widehat{var}(\widehat{TP0}) = N^2 \times \frac{\widehat{p01}(1 - \widehat{p01})}{n + Z4} \times fpc,$$

$$\widehat{var}(\widehat{FP0}) = N^2 \times \frac{\widehat{p02}(1 - \widehat{p02})}{n + Z4} \times fpc,$$

$$cov(\widehat{TP0}, \widehat{FP0}) = N^2 \times \left(-\frac{\widehat{p01} \times \widehat{p02}}{n + Z4} \times fpc\right),$$

$$\widehat{p01} \stackrel{def}{=} \left(\frac{tp + Z2}{n + Z4}\right),$$

$$\widehat{p02} \stackrel{def}{=} \left(\frac{fp + Z2}{n + Z4}\right),$$

$$fpc \stackrel{def}{=} \frac{N - (n + Z4)}{N - 1},$$

$$Z0 \stackrel{def}{=} z_{1-\alpha/2},$$

$z_{1-\alpha/2}$ is the $(1-\alpha/2)$ percentile of a standard normal distribution,
$\alpha$ is the error percentile,
$(1-\alpha) \times 100\%$ is the precision confidence level,
tp is the number of true positives in the set of test documents,
fp is the number of false positives in the set of test documents,
N is the size of the corpus of documents, and
n is the sample size, which equals the number of documents in the set of test documents.

The recall for the classification model can be a measure of the fraction of the actually positive documents that are classification model-predicted positives. Recall can be defined as:

recall=TP/(TP+FN), where

TP is the number of true positives in the corpus of documents, and
FN is the number of false negatives in the corpus of documents.

Processing logic can use the estimate for the number of true positives in the corpus of documents (interval estimate and point estimate for TP) and the estimate for the number of false negatives in the corpus of documents (interval estimate and point estimate for FN) to estimate the recall on the corpus of documents. The estimates for TP and FN can be derived from the number of true positives in the set of test documents and the number of false negatives in the set of test documents. In one embodiment, the recall is estimated using the formula:

$$\widehat{recall} = \frac{1}{1 + \frac{\widehat{FN}}{\widehat{TP}}},$$

with a $(1-\alpha) \times 100\%$ recall confidence interval $[\widehat{recall0} - Z0\sqrt{\widehat{var}(\widehat{recall0})}, \widehat{recall0} + Z0\sqrt{\widehat{var}(\widehat{recall0})}]$, where $$\widehat{recall0} = \frac{1}{1 + \frac{\widehat{FN0}}{\widehat{TP0}}},$$ and with the delta method, $$\widehat{var}(\widehat{recall0}) = \frac{\widehat{var}(\widehat{FN0}) \times \widehat{TP0}^2 + \widehat{var}(\widehat{TP0}) \times \widehat{FN0}^2 - 2 \times \widehat{TP0} \times \widehat{FN0} \times cov(\widehat{TP0}, \widehat{FN0})}{(\widehat{TP0} + \widehat{FN0})^4},$$

where $$\widehat{TP0} = \tilde{p}01 \times N,$$

$$\widehat{FN0} = \tilde{p}04 \times N,$$

$$\widehat{var}(\widehat{TP0}) = N^2 \times \frac{\tilde{p}01(1 - \tilde{p}01)}{n + Z4} \times fpc,$$

$$\widehat{var}(\widehat{FN0}) = N^2 \times \frac{\tilde{p}04(1 - \tilde{p}04)}{n + Z4} \times fpc,$$

$$cov(\widehat{TP0}, \widehat{FN0}) = N^2 \times \left(-\frac{\tilde{p}01 \times \tilde{p}04}{n + Z4} \times fpc\right),$$

$$\tilde{p}01 \stackrel{def}{=} \left(\frac{tp + Z2}{n + Z4}\right),$$

$$\tilde{p}04 \stackrel{def}{=} \left(\frac{fn + Z2}{n + Z4}\right),$$

$$fpc \stackrel{def}{=} \frac{N - (n + Z4)}{N - 1},$$

$$Z0 \stackrel{def}{=} z_{1-\alpha/2},$$

$$Z4 \stackrel{def}{=} (Z0)^2 = (z_{1-\alpha/2})^2,$$

$$Z2 \stackrel{def}{=} \frac{Z4}{2} = \left(z_{1-\frac{\alpha}{2}}\right)^2 / 2,$$

$z_{1-\alpha/2}$ is the $(1-\alpha/2)$ percentile of a standard normal distribution, $\alpha$ is the error percentile, $(1-\alpha) \times 100\%$ is the recall confidence level, tp is the number of true positives in the set of test documents, fn is the number of false negatives in the set of test documents, N is the size of the corpus of documents, and n is the sample size, which equals the number of documents in the set of test documents.

The F-measure of the classification model can be a harmonic mean of the precision and recall. The F-measure can be defined as:

F-measure=(2×precision×recall)/(precision+recall).

Processing logic can use the estimates for the precision and the estimates for the recall to estimate the F-measure on the corpus of documents. In one embodiment, the F-measure is estimated using the formula:

$$\widehat{F} = \frac{2}{\frac{1}{\widehat{R}} + \frac{1}{\widehat{P}}},$$

with a $(1-\alpha) \times 100\%$ F-measure confidence interval $[\widehat{F0} - Z0\sqrt{\widehat{var}(\widehat{F0})}, \widehat{F0} + Z0\sqrt{\widehat{var}(\widehat{F0})}]$, where $$\widehat{P} \stackrel{def}{=} \widehat{precision},$$

$$\widehat{P0} \stackrel{def}{=} \widehat{precision0},$$

$$\widehat{R} \stackrel{def}{=} \widehat{recall},$$

$$\widehat{R0} \stackrel{def}{=} \widehat{recall0},$$

$$\widehat{F0} = \frac{2}{\frac{1}{\widehat{R0}} + \frac{1}{\widehat{P0}}},$$

$$\widehat{var}(\widehat{F0}) = (\widehat{F0})^2 \left(\frac{\widehat{var}\left(\frac{1}{\widehat{R0}} + \frac{1}{\widehat{P0}}\right)}{\left(\frac{1}{\widehat{R0}} + \frac{1}{\widehat{P0}}\right)^2}\right),$$

$z_{1-\alpha/2}$ is the $(1-\alpha/2)$ percentile of a standard normal distribution, $\alpha$ is the error percentile, $(1-\alpha) \times 100\%$ is the F-measure confidence level, tp is the number of true positives in the set of test documents, fp is the number of false positives in the set of test documents, fn is the number of false negatives in the set of test documents, N is the size of the corpus of documents, and n is the sample size, which equals the number of documents in the set of test documents.

Figure 6:
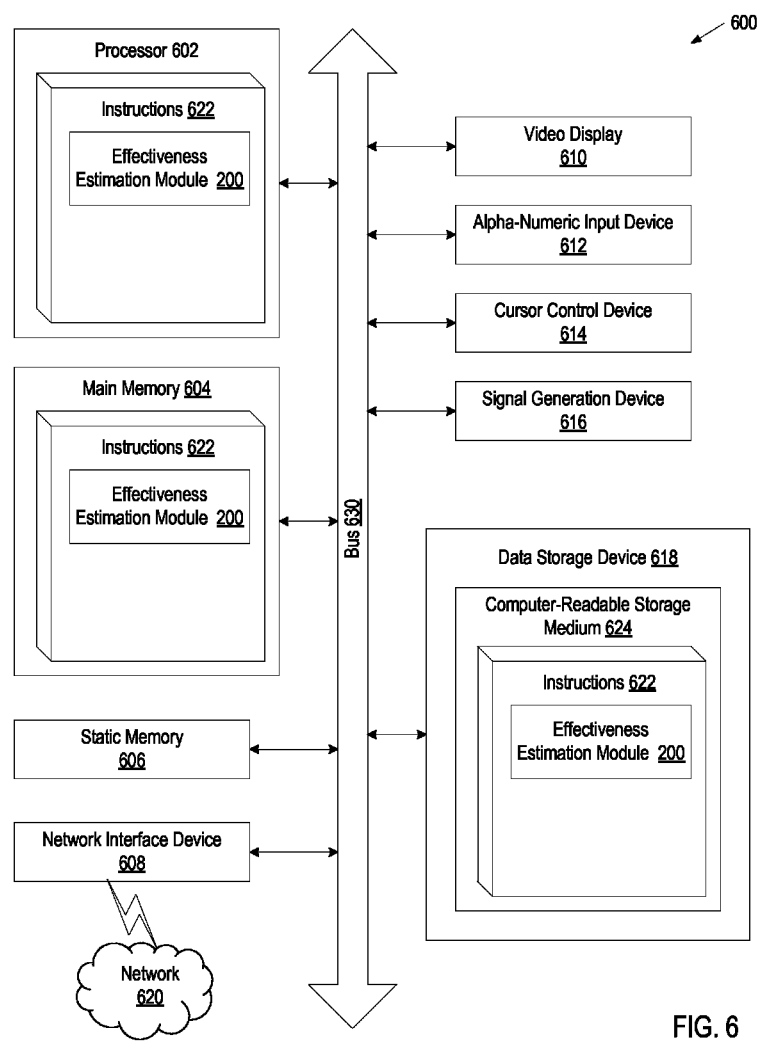
FIG. 6 is a block diagram of an exemplary computer system that may perform one or more of the operations described herein.

FIG. 6 illustrates a diagram of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 624 on which is stored one or more sets of instructions 622 (e.g., software) embodying any one or more of the methodologies or functions described herein. The instructions 622 may also reside, completely or at least partially, within the main memory 604 and/or within the processor 602 during execution thereof by the computer system 600, the main memory 604 and the processor 602 also constituting computer-readable storage media. The instructions 622 may further be transmitted or received over a network 620 via the network interface device 608.

In one embodiment, the instructions 622 include instructions for an effectiveness estimation module (e.g., effectiveness estimation module 200 of FIG. 2) and/or a software library containing methods that call an effectiveness estimation module. While the computer-readable storage medium 624 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that causes the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "presenting", "updating", "determining", "calculating," "providing," "receiving," "selecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for a server computing system, comprising:
   determining, by the server computing system, a plurality of statistics for a plurality of validation documents;
   determining a number for a sample size of test documents in a plurality of test documents based on the plurality of statistics for the plurality of validation documents and an effectiveness measure of interest;
   determining, by the server computing system, a plurality of statistics for the plurality of test documents, wherein a number of test documents in the plurality of test documents is the number for the sample size of test documents;
   determining a number of false negatives for a corpus of documents based on the sample size and one or more of the plurality of statistics for the plurality of test documents, wherein a document of the corpus of documents is a false negative if classification of the document by a classification model is negative and classification of the document by a user is positive; and calculating, by the server computing system, an effectiveness of an information retrieval system on a corpus of documents based on the number of false negatives for the corpus of documents.

2. The method of claim 1, wherein calculating the effectiveness of an information retrieval system comprises:
  calculating a number of true positives in the corpus of documents based on the number of test documents in the plurality of test documents, a size of the corpus of documents, a predetermined confidence level, and the plurality of statistics for the plurality of test documents;
  calculating a number of false positives in the corpus of documents based on the number of test documents in the plurality of test documents, the size of the corpus of documents, the predetermined confidence level, and the plurality of statistics for the plurality of test documents;
  calculating the number of false negatives in the corpus of documents based on the number of test documents in the plurality of test documents, the size of the corpus of documents, the predetermined confidence level, and the plurality of statistics for the plurality of test documents; and
  calculating a plurality of effectiveness measures for the corpus of documents based on one or more of the number of true positives, the number of false positives, or the number of false negatives.

3. The method of claim 2, wherein calculating the number of true positives in the corpus of documents comprises applying a true positive number formula $$\widehat{TP} = \left(\frac{tp}{n}\right) \times N,$$

with a $(1-\alpha) \times 100\%$ confidence interval defined by a formula:
$[(\widehat{p01} - Z0\sqrt{\widehat{var(p01)}}) \times N, (\widehat{p01} + Z0\sqrt{\widehat{var(p01)}}) \times N]$,
wherein $$\widehat{p01} = \left(\frac{tp + Z2}{n + Z4}\right),$$

wherein $$\widehat{var}(\widehat{p01}) = \frac{\widehat{p01}(1 - \widehat{p01})}{n + Z4} \times fpc,$$

wherein $$fpc = \frac{N - (n + Z4)}{N - 1},$$

wherein $Z0 = z_{1-\alpha/2}$
wherein $Z4 = (Z0)^2 = (z_{1-\alpha/2})^2$,
wherein $$Z2 = \frac{Z4}{2} = \left(z_{1-\frac{\alpha}{2}}\right)^2 / 2,$$

wherein $z_{1-\alpha/2}$ is a $(1-a/2)$ percentile of a standard normal distribution, wherein $\alpha$ is an error percentile, wherein $(1-\alpha) \times 100\%$ is the predetermined confidence level, wherein tp is a number of true positives in the plurality of test documents, wherein N is the size of the corpus of documents, wherein n is the number of test documents, wherein calculating the number of false positives comprises applying a false positive number formula $$\widehat{FP} = \left(\frac{fp}{n}\right) \times N,$$

with a $(1-\alpha) \times 100\%$ confidence interval defined by a formula:
$[(\widehat{p02} - Z0\sqrt{\widehat{var(p02)}}) \times N, (\widehat{p02} + Z0\sqrt{\widehat{var(p02)}}) \times N]$,
wherein $$\widehat{p02} = \left(\frac{fp + Z2}{n + Z4}\right),$$

wherein $$\widehat{var}(\widehat{p02}) = \frac{\widehat{p02}(1 - \widehat{p02})}{n + Z4} \times fpc,$$

wherein fp is a number of false positives in the plurality of test documents, wherein calculating the number of false negatives comprises applying a false negative number formula $$\widehat{FN} = \left(\frac{fn}{n}\right) \times N,$$

with a $(1-\alpha) \times 100\%$ confidence interval defined by a formula
$[(\widehat{p04} - Z0\sqrt{\widehat{var(p04)}}) \times N, (\widehat{p04} + Z0\sqrt{\widehat{var(p04)}}) \times N]$,
wherein $$\widehat{p04} = \left(\frac{fn + Z2}{n + Z4}\right),$$

wherein $$\widehat{var}(\widehat{p04}) = \frac{\widehat{p04}(1 - \widehat{p04})}{n + Z4} \times fpc,$$

and
  wherein fn is a number of false negatives in the plurality of test documents.

4. The method of claim 2, wherein the plurality of effectiveness measures comprise at least one of: precision, recall, and F-measure, wherein the precision is calculated using a precision formula $$\widehat{precision} = \frac{1}{1 + \frac{\widehat{FP}}{\widehat{TP}}},$$

with a $(1-\alpha)\times 100\%$ precision confidence interval [$\widehat{precision0} - Z0\sqrt{\widehat{var}(precision0)}$, $\widehat{precision0} + Z0\sqrt{\widehat{var}(precision0)}$],
wherein $$\widehat{precision0} = \frac{1}{1 + \frac{\widehat{FP0}}{\widehat{TP0}}},$$

wherein $$\widehat{var}(\widehat{precision0}) = \frac{\widehat{var}(\widehat{FP0}) \times \widehat{TP0}^2 + \widehat{var}(\widehat{TP0}) \times \widehat{FP0}^2 - 2 \times \widehat{TP0} \times \widehat{FP0} \times cov(\widehat{TP0}, \widehat{FP0})}{(\widehat{TP0} + \widehat{FP0})^4},$$

wherein $\widehat{TP0} = \widehat{p01} \times N$,
wherein $\widehat{FP0} = \widehat{p02} \times N$,
wherein $$\widehat{var}(\widehat{TP0}) = N^2 \times \frac{\hat{p}01(1-\hat{p}01)}{n+Z4} \times fpc,$$

wherein $$\widehat{var}(\widehat{FP0}) = N^2 \times \frac{\hat{p}02(1-\hat{p}02)}{n+Z4} \times fpc,$$

wherein $$cov(\widehat{TP0}, \widehat{FP0}) = N^2 \times \left(-\frac{\hat{p}01 \times \hat{p}02}{n+Z4} \times fpc\right),$$

wherein $$\hat{p}01 = \left(\frac{tp + Z2}{n + Z4}\right),$$

wherein $$\hat{p}02 = \left(\frac{fp + Z2}{n + Z4}\right),$$

wherein $$fpc = \frac{N - (n + Z4)}{N - 1},$$

wherein $Z0 = z_{1-\alpha/2}$,
wherein $Z4 = (Z0)^2 = (z_{1-\alpha/2})^2$,
wherein $$Z2 = \frac{Z4}{2} = \left(z_{1-\frac{\alpha}{2}}\right)^2 / 2,$$

wherein $z_{1-\alpha/2}$ is a $(1-\alpha/2)$ percentile of a standard normal distribution,
wherein $\alpha$ is an error percentile,
wherein $(1-\alpha)\times 100\%$ is the predetermined effectiveness confidence level,
wherein tp is a number of true positives in the plurality of test documents,
wherein fp is a number of false positives in the plurality of test documents,
wherein N is the size of the corpus of documents,
wherein n is the number of test documents,
wherein the recall is calculated using a recall formula $$\widehat{recall} = \frac{1}{1 + \frac{\widehat{FN}}{\widehat{TP}}},$$

with a $(1-\alpha)\times 100\%$ recall confidence interval [$\widehat{recall0} - Z0\sqrt{\widehat{var}(recall0)}$, $\widehat{recall0} + Z0\sqrt{\widehat{var}(recall0)}$],
wherein $$\widehat{recall0} = \frac{1}{1 + \frac{\widehat{FN0}}{\widehat{TP0}}},$$

wherein $$\widehat{var}(\widehat{recall0}) = \frac{\widehat{var}(\widehat{FN0}) \times \widehat{TP0}^2 + \widehat{var}(\widehat{TP0}) \times \widehat{FN0}^2 - 2 \times \widehat{TP0} \times \widehat{FN0} \times cov(\widehat{TP0}, \widehat{FN0})}{(\widehat{TP0} + \widehat{FN0})^4},$$

wherein $\widehat{FN0} = \widehat{p04} \times N$,
wherein $$\widehat{var}\,\widehat{FN0} = N^2 \times \frac{\hat{p}04(1-\hat{p}04)}{n+Z4} \times fpc,$$

wherein $$cov(\widehat{TP0}, \widehat{FN0}) = N^2 \times \left(-\frac{\hat{p}01 \times \hat{p}04}{n+Z4} \times fpc\right),$$

wherein $$\widehat{p04} = \left(\frac{fn + Z2}{n + Z4}\right),$$

wherein fn is a number of false negatives in the plurality of test documents,
wherein the F-measure is calculated using an F-measure formula $$\hat{F} = \frac{2}{\frac{1}{R} + \frac{1}{P}},$$

with a $(1-\alpha) \times 100\%$ F-measure confidence interval $[\widehat{F0} - Z0\sqrt{\widehat{var}(\widehat{F0})}, \widehat{F0} + Z0\sqrt{\widehat{var}(\widehat{F0})}]$,
wherein $\hat{P} = \widehat{precision}$,
wherein $\widehat{P0} = \widehat{precision0}$,
wherein $\hat{R} = \widehat{recall}$,
wherein $\widehat{R0} = \widehat{recall0}$,
wherein $$\widehat{F0} = \frac{2}{\frac{1}{\widehat{R0}} + \frac{1}{\widehat{P0}}},$$

wherein $$\widehat{var}\,\widehat{F0} = (\widehat{F0})^2 \left(\frac{\widehat{var}\left(\frac{1}{\widehat{R0}} + \frac{1}{\widehat{P0}}\right)}{\left(\frac{1}{\widehat{R0}} + \frac{1}{\widehat{P0}}\right)^2}\right),$$

wherein $$\widehat{var}\left(\frac{1}{\widehat{R0}} + \frac{1}{\widehat{P0}}\right) = \left(\frac{1}{\widehat{R0}}\right)^2 \left(\frac{\widehat{var}(\widehat{R0})}{\widehat{R0}^2}\right) + \left(\frac{1}{\widehat{P0}}\right)^2 \left(\frac{\widehat{var}(\widehat{P0})}{\widehat{P0}^2}\right) + 2 \times cov\left(\frac{1}{\widehat{P0}}, \frac{1}{\widehat{R0}}\right),$$

and
wherein $$cov\left(\frac{1}{\widehat{P0}}, \frac{1}{\widehat{R0}}\right) = \frac{fpc}{n + Z4} \times \frac{\widehat{p02} \times \widehat{p04}}{(\widehat{p01})^3}.$$

5. The method of claim 1, wherein determining the number for the sample size of test documents based on the plurality of statistics for the plurality of validation documents and the effectiveness measure of interest comprises:
   applying a formula using the plurality of statistics for the plurality of validation documents and the effectiveness measure of interest.

6. The method of claim 5, wherein when the effectiveness measure of interest is the F-measure, the formula for the number of test documents is:

$$n = \frac{(N - Z4) \times n0 - Z4 \times (Z4 - 1)}{N + n0 + Z4 - 1},$$

wherein $$n0 = \frac{4A}{B \times C} - Z4,$$

wherein $$A = \frac{\widehat{p04} \times (1 - \widehat{p04}) \times (\widehat{p01})^2 + \widehat{p01} \times (1 - \widehat{p01}) \times (\widehat{p04})^2 +}{(\widehat{p01})^4} +$$
$$\frac{\widehat{p02} \times (1 - \widehat{p02}) \times (\widehat{p01})^2 + \widehat{p01} \times (1 - \widehat{p01}) \times (\widehat{p02})^2}{(\widehat{p01})^4} +$$
$$\frac{2 \times (\widehat{p01})^2 \times (\widehat{p02})^2 + 2 \times (\widehat{p01})^2 \times (\widehat{p04})^2 + 2 \times \widehat{p01} \times \widehat{p02} \times \widehat{p04}}{(\widehat{p01})^4},$$

wherein $$B = \left(\frac{\widehat{p02}}{\widehat{p01}} + \frac{\widehat{p04}}{\widehat{p01}} + 2\right)^4,$$

wherein $C = (2 \times Z0)^2$,
wherein $$\widehat{p01} = \left(\frac{tp\_v + Z2}{n\_v + Z4}\right)$$

is a center of a population true positive rate confidence interval,
wherein $$\widehat{p02} = \left(\frac{fp\_v + Z2}{n\_v + Z4}\right)$$

is a center of a population false positive rate confidence interval,
wherein $$\widehat{p04} = \left(\frac{fn\_v + Z2}{n\_v + Z4}\right)$$

is a center of a population false negative rate confidence interval,
wherein $Z0 = z_{1-\alpha/2}$,
wherein $Z4 = (Z0)^2 = (z_{1-\alpha/2})^2$,
wherein $$Z2 = \frac{Z4}{2} = \left(z_{1-\frac{\alpha}{2}}\right)^2 / 2,$$

wherein $z_{1-\alpha/2}$ is $(1-\alpha/2)$ percentile of a standard normal distribution, wherein α is an error percentile, wherein $(1-\alpha)\times 100\%$ is the predetermined effectiveness confidence level, wherein W is a confidence interval width of the effectiveness measure of interest, wherein tp_v is a number of true positives in the plurality of validation documents, wherein fp_v is a number of false positives in the plurality of validation documents, wherein fn_v is a number of false negatives in the plurality of validation documents, wherein N is the size of the corpus of documents, wherein n_v is a number of documents in the plurality of validation documents, wherein when the effectiveness measure of interest is the recall, the formula for the number of test documents is $$n = \frac{(N-Z4)\times n1 - Z4 \times (Z4-1)}{N + n1 + Z4 - 1},$$

wherein $$n1 = \frac{A1}{C} - Z4,$$

wherein $$A1 = \frac{\widehat{p04}\times(1-\widehat{p04})\times(\widehat{p01})^2 + \widehat{p01}\times(1-\widehat{p01})\times(\widehat{p04})^2 + 2\times(\widehat{p01})^2\times(\widehat{p04})^2}{(\widehat{p01}+\widehat{p04})^4},$$

wherein when the effectiveness measure of interest is the precision, the formula for the number of test documents is $$n = \frac{(N-Z4)\times n2 - Z4 \times (Z4-1)}{N + n2 + Z4 - 1},$$

wherein $$n2 = \frac{A2}{C} - Z4,$$

and
wherein $$A2 = \frac{\widehat{p02}\times(1-\widehat{p02})\times(\widehat{p01})^2 + \widehat{p01}\times(1-\widehat{p01})\times(\widehat{p02})^2 + 2\times(\widehat{p01})^2\times(\widehat{p02})^2}{(\widehat{p01}+\widehat{p02})^4}.$$

7. The method of claim 1, wherein determining the plurality of statistics for the plurality of test documents comprises:
obtaining a user classification for each of the plurality of test documents from a user;
obtaining a system classification for each of the plurality of test documents from an information retrieval system; and
calculating the plurality of statistics for the plurality of test documents based on the user classification for each of the plurality of test documents and the system classification for each of the plurality of test documents.

8. The method of claim 1, wherein the plurality of statistics for the plurality of test documents comprise at least one of: a number of documents that are true positives, a number of documents that are false positives, a number of documents that are true negatives, or a number of documents that are false negatives.

9. The method of claim 1, wherein determining the plurality of statistics for the plurality of validation documents comprises:
obtaining a user classification for each of the plurality of validation documents from a user;
obtaining a system classification for each of the plurality of validation documents from the information retrieval system; and
calculating the plurality of statistics for the plurality of validation documents based on the user classification for each of the plurality of validation documents and the system classification for each of the plurality of validation documents.

10. The method of claim 1, wherein the plurality of statistics for the plurality of validation documents comprise at least one of: a number of documents that are true positives, a number of documents that are false positives, a number of documents that are true negatives, or a number of documents that are false negatives.

11. The method of claim 1, further comprising:
selecting the plurality of validation documents, wherein selecting the plurality of validation documents comprises:
randomly splitting the corpus of documents into a plurality of sub corpora, wherein the plurality of sub-corpora comprise a training sub-corpus, a validation sub-corpus, and a test sub-corpus, and
randomly selecting the plurality of validation documents from the validation sub-corpus of documents; and
selecting the plurality of test documents, wherein selecting the plurality of test documents comprises randomly selecting the plurality of test documents from the test sub-corpus of documents.

12. The method of claim 11, wherein a number of validation documents in the plurality of validation documents is predetermined.

13. A non-transitory computer-readable storage medium having instructions that, when executed by a processing device, cause the processing device to perform operations comprising:
determining a plurality of statistics for a plurality of validation documents;
determining, by the processing device, a number for a sample size of test documents in a plurality of test documents based on the plurality of statistics for the plurality of validation documents and an effectiveness measure of interest;
determining a plurality of statistics for the plurality of test documents, wherein a number of test documents in the plurality of test documents is the number for the sample size of test documents t;
determining a number of false negatives for a corpus of documents based on the sample size and one or more of the plurality of statistics for the plurality of test documents, wherein a document of the corpus of documents is a false negative if classification of the document by a classification model is negative and classification of the document by a user is positive; and calculating an effectiveness of an information retrieval system on a corpus of documents based on the number of false negatives for the corpus of documents.

14. The non-transitory computer-readable storage medium of claim 13, wherein calculating the effectiveness of an information retrieval system comprises:

calculating a number of true positives in the corpus of documents based on the number of test documents in the plurality of test documents, a size of the corpus of documents, a predetermined confidence level, and the plurality of statistics for the plurality of test documents;

calculating a number of false positives in the corpus of documents based on the number of test documents in the plurality of test documents, the size of the corpus of documents, the predetermined confidence level, and the plurality of statistics for the plurality of test documents;

calculating the number of false negatives in the corpus of documents based on the number of test documents in the plurality of test documents, the size of the corpus of documents, the predetermined confidence level, and the plurality of statistics for the plurality of test documents; and calculating a plurality of effectiveness measures for the corpus of documents based on one or more of the number of true positives, the number of false positives, or the number of false negatives.

15. The non-transitory computer-readable storage medium of claim 14, wherein calculating the number of true positives in the corpus of documents comprises applying a true positive number formula $$\widehat{TP} = \left(\frac{tp}{n}\right) \times N,$$

with a $(1-\alpha) \times 100\%$ confidence interval defined by a formula $[(\widehat{p01} - Z0\sqrt{\widehat{var}(\widehat{p01})}) \times N, (\widehat{p01} + Z0\sqrt{\widehat{var}(\widehat{p01})}) \times N]$, wherein $$\widehat{p01} = \left(\frac{tp + Z2}{n + Z4}\right),$$

wherein $$\widehat{var}(\widehat{p01}) = \frac{\widehat{p01}(1 - \widehat{p01})}{n + Z4} \times fpc,$$

wherein $$fpc = \frac{N - (n + Z4)}{N - 1},$$

wherein $Z0 = z_{1-\alpha/2}$,
wherein $Z4 = (Z0)^2 = (z_{1-\alpha/2})^2$, wherein $$Z2 = \frac{Z4}{2} = \left(z_{1-\frac{\alpha}{2}}\right)^2 / 2,$$

wherein $z_{1-\alpha/2}$ is a $(1-\alpha/2)$ percentile of a standard normal distribution,
wherein $\alpha$ is an error percentile,
wherein $(1-\alpha) \times 100\%$ is the predetermined confidence level,
wherein tp is a number of true positives in the plurality of test documents,
wherein N is the size of the corpus of documents,
wherein n is the number of test documents,
wherein calculating the number of false positives comprises applying a false positive number formula $$\widehat{FP} = \left(\frac{fp}{n}\right) \times N,$$

with a $(1-\alpha) \times 100\%$ confidence interval defined by a formula $[(\widehat{p02} - Z0\sqrt{\widehat{var}(\widehat{p02})}) \times N, (\widehat{p02} + Z0\sqrt{\widehat{var}(\widehat{p02})}) \times N]$, wherein $$\widehat{p02} = \left(\frac{fp + Z2}{n + Z4}\right),$$

wherein $$\widehat{var}(\widehat{p02}) = \frac{\widehat{p02}(1 - \widehat{p02})}{n + Z4} \times fpc,$$

wherein fp is a number of false positives in the plurality of test documents,
wherein calculating the number of false negatives comprises applying a false negative number formula $$\widehat{FN} = \left(\frac{fn}{n}\right) \times N,$$

with a $(1-\alpha) \times 100\%$ confidence interval defined by a formula $[(\widehat{p04} - Z0\sqrt{\widehat{var}(\widehat{p04})}) \times N, (\widehat{p04} + Z0\sqrt{\widehat{var}(\widehat{p04})}) \times N]$, wherein $$\widehat{p04} = \left(\frac{fn + Z2}{n + Z4}\right),$$

wherein $$\widehat{var}(\widehat{p04}) = \frac{\widehat{p04}(1 - \widehat{p04})}{n + Z4} \times fpc,$$

and
wherein fn is a number of false negatives in the plurality of test documents.

16. The non-transitory computer-readable storage medium of claim 14, wherein the plurality of effectiveness measures comprise at least one of: precision, recall, and F-measure, wherein the precision is calculated using a precision formula $$\widehat{precision} = \frac{1}{1 + \frac{\widehat{FP}}{\widehat{TP}}},$$

with a $(1-\alpha) \times 100\%$ precision confidence interval $[\widehat{precision0} - Z0\sqrt{\widehat{var(precision0)}}, \widehat{precision0} + Z0\sqrt{\widehat{var(precision0)}}]$, wherein $$\widehat{precision0} = \frac{1}{1 + \frac{\widehat{FP0}}{\widehat{TP0}}},$$

wherein $$\widehat{var}(\widehat{precision0}) = \frac{\widehat{var}(\widehat{FP0}) \times \widehat{TP0}^2 + \widehat{var}(\widehat{TP0}) \times \widehat{FP0}^2 - 2 \times \widehat{TP0} \times \widehat{FP0} \times cov(\widehat{TP0}, \widehat{FP0})}{(\widehat{TP0} + \widehat{FP0})^4},$$

wherein $\widehat{TP0} = \hat{p}01 \times N$,
wherein $\widehat{FP0} = \hat{p}02 \times N$,
wherein $$\widehat{var}(\widehat{TP0}) = N^2 \times \frac{\hat{p}01(1 - \hat{p}01)}{n + Z4} \times fpc,$$

wherein $$\widehat{var}(\widehat{FP0}) = N^2 \times \frac{\hat{p}02(1 - \hat{p}02)}{n + Z4} \times fpc,$$

wherein $$cov(\widehat{TP0}, \widehat{FP0}) = N^2 \times \left(-\frac{\hat{p}01 \times \hat{p}02}{n + Z4} \times fpc\right),$$

wherein $$\hat{p}01 = \left(\frac{tp + Z2}{n + Z4}\right),$$

wherein $$\hat{p}02 = \left(\frac{fp + Z2}{n + Z4}\right),$$

wherein $$fpc = \frac{N - (n + Z4)}{N - 1},$$

wherein $Z0 = z_{1-\alpha/2}$,
wherein $Z4 = (Z0)^2 = (z_{1-\alpha/2})^2$,
wherein $$Z2 = \frac{Z4}{2} = \left(z_{1-\frac{\alpha}{2}}\right)^2 / 2,$$

wherein $z_{1-\alpha/2}$ is a $(1-\alpha/2)$ percentile of a standard normal distribution,
wherein $\alpha$ is an error percentile,
wherein $(1-\alpha) \times 100\%$ is the predetermined effectiveness confidence level,
wherein tp is a number of true positives in the plurality of test documents,
wherein fp is a number of false positives in the plurality of test documents,
wherein N is the size of the corpus of documents,
wherein n is the number of test documents,
wherein the recall is calculated using a recall formula $$\widehat{recall} = \frac{1}{1 + \frac{\widehat{FN}}{\widehat{TP}}},$$

with a $(1-\alpha) \times 100\%$ recall confidence $[\widehat{recall0} - Z0\sqrt{\widehat{var(recall0)}}, \widehat{recall0} + Z0\sqrt{\widehat{var(recall0)}}]$, wherein $$\widehat{recall0} = \frac{1}{1 + \frac{\widehat{FN0}}{\widehat{TP0}}},$$

wherein $$\widehat{var}(\widehat{recall0}) = \frac{\widehat{var}(\widehat{FN0}) \times \widehat{TP0}^2 + \widehat{var}(\widehat{TP0}) \times \widehat{FN0}^2 - 2 \times \widehat{TP0} \times \widehat{FN0} \times cov(\widehat{TP0}, \widehat{FN0})}{(\widehat{TP0} + \widehat{FN0})^4},$$

wherein $\widehat{FN0} = \hat{p}04 \times N$,
wherein $$\widehat{var}(\widehat{FN0}) = N^2 \times \frac{\hat{p}04(1 - \hat{p}04)}{N + z4} \times fpc,$$

wherein $$cov(\widehat{TP0}, \widehat{FN0}) = N^2 \times \left(-\frac{\hat{p}01 \times \hat{p}04}{n + Z4} \times fpc\right),$$

wherein $$\widehat{p04} = \left(\frac{fn + Z2}{n + Z4}\right),$$

wherein fn is a number of false negatives in the plurality of test documents, wherein the F-measure is calculated using an F-measure formula $$\hat{F} = \frac{1}{\frac{1}{\hat{R}} + \frac{1}{\hat{P}}},$$

with a $(1-\alpha) \times 100\%$ F-measure confidence interval [$\widehat{F0} - Z0\sqrt{\widehat{var(F0)}}, \widehat{F0} + Z0\sqrt{\widehat{var(F0)}}$], wherein $\hat{P} = \widehat{precision}$,
wherein $\widehat{P0} = \widehat{precision0}$,
wherein $\hat{R} = \widehat{recall}$,
wherein $\widehat{R0} = \widehat{recall0}$,
wherein $$\widehat{F0} = \frac{1}{\frac{1}{\widehat{R0}} + \frac{1}{\widehat{P0}}},$$

wherein $$\widehat{var}(\widehat{F0}) = (\widehat{F0})^2 \left(\frac{\widehat{var}\left(\frac{1}{\widehat{R0}} + \frac{1}{\widehat{P0}}\right)}{\left(\frac{1}{\widehat{R0}} + \frac{1}{\widehat{P0}}\right)}\right),$$

wherein $$\widehat{var}\left(\frac{1}{\widehat{R0}} + \frac{1}{\widehat{P0}}\right) = \left(\frac{1}{\widehat{R0}}\right)^2 \left(\frac{\widehat{var}(\widehat{R0})}{\widehat{R0}^2}\right) + \left(\frac{1}{\widehat{P0}}\right)^2 \left(\frac{\widehat{var}(\widehat{P0})}{\widehat{P0}^2}\right) + 2 \times cov\left(\frac{1}{\widehat{P0}}, \frac{1}{\widehat{R0}}\right),$$

and
wherein $$cov\left(\frac{1}{\widehat{P0}}, \frac{1}{\widehat{R0}}\right) = \frac{fpc}{n + Z4} \times \frac{\widehat{p02} \times \widehat{p04}}{(\widehat{p01})^2}.$$

17. The non-transitory computer-readable storage medium of claim 13, wherein determining the number for the sample size of test documents based on the plurality of statistics for the plurality of validation documents and the effectiveness metric of interest comprises:
applying a formula using the plurality of statistics for the plurality of validation documents and the effectiveness metric of interest.

18. The non-transitory computer-readable storage medium of claim 17, wherein when the effectiveness measure of interest is the F-measure, the formula for the number of test documents is:

$$n = \frac{(N - Z4) \times n0 - Z4 \times (Z4 - 1)}{N + n0 + Z4 - 1},$$

wherein $$n0 = \frac{4A}{B \times C} - Z4,$$

wherein $$A = \frac{\widehat{p04} \times (1 - \widehat{p04}) \times (\widehat{p01})^2 + \widehat{p01} \times (1 - \widehat{p01}) \times (\widehat{p04})^2 + \widehat{p02} \times (1 - \widehat{p02}) \times (\widehat{p01})^2 + \widehat{p01} \times (1 - \widehat{p01}) \times (\widehat{p02})^2}{(\widehat{p01})^4} + \frac{2 \times (\widehat{p01})^2 \times (\widehat{p02})^2 + 2 \times (\widehat{p01})^2 \times (\widehat{p04})^2 + 2 \times \widehat{p01} \times \widehat{p02} \times \widehat{p04}}{(\widehat{p01})^4},$$

wherein $$B = \left(\frac{\widehat{p02}}{\widehat{p01}} + \frac{\widehat{p04}}{\widehat{p01}} + 2\right)^4,$$

wherein $C = (W/(2 \times Z0))^2$,
wherein $$\widehat{p01} = \left(\frac{tp\_v + Z2}{n\_v + Z4}\right)$$

is a center of a population true positive rate confidence interval,
wherein $$\widehat{p02} = \left(\frac{fp\_v + Z2}{n\_v + Z4}\right)$$

is a center of a population false positive rate confidence interval,
wherein $$\widehat{p04} = \left(\frac{fn\_v + Z2}{n\_v + Z4}\right)$$

is a center of a population false negative rate confidence interval,
wherein $Z0 = z_{1-\alpha/2}$,
wherein $Z4 = (Z0)^2 = (z_{1-\alpha/2})^2$, wherein $$Z2 = \frac{Z4}{2} = \left(Z_{1-\frac{\alpha}{2}}\right)^2 / 2,$$

wherein $z_{1-\alpha/2}$ is $(1-\alpha/2)$ percentile of a standard normal distribution, wherein $\alpha$ is an error percentile, wherein $(1-\alpha)\times 100\%$ is the predetermined effectiveness confidence level, wherein W is a confidence interval width of the effectiveness measure of interest, wherein tp_v is a number of true positives in the plurality of validation documents, wherein fp_v is a number of false positives in the plurality of validation documents, wherein fn_v is a number of false negatives in the plurality of validation documents, wherein N is the size of the corpus of documents, wherein n_v is a number of documents in the plurality of validation documents, wherein when the effectiveness measure of interest is the recall, the formula for the number of test documents is $$n = \frac{(N - Z4) \times n1 - Z4 \times (Z4 - 1)}{N + n1 + Z4 - 1},$$

wherein $$n1 = \frac{A1}{C} - Z4,$$

wherein $$A1 = \frac{\vec{p}04 \times (1 - \vec{p}04) \times (\vec{p}01)^2 + \vec{p}01 \times (1 - \vec{p}01) \times (\vec{p}04)^2 + 2 \times (\vec{p}01)^2 \times (\vec{p}04)^2}{(\vec{p}01 + \vec{p}04)^4},$$

wherein when the effectiveness measure of interest is the precision, the formula for the number of test documents is $$n = \frac{(N - Z4) \times n2 - Z4 \times (Z4 - 1)}{N + n2 + Z4 - 1},$$

wherein $$n2 = \frac{A2}{c} - Z4,$$

and wherein $$A2 = \frac{\vec{p}02 \times (1 - \vec{p}02) \times (\vec{p}01)^2 + \vec{p}01 \times (1 - \vec{p}01) \times (\vec{p}02)^2 + 2 \times (\vec{p}01)^2 \times (\vec{p}02)^2}{(\vec{p}01 + \vec{p}02)^4}.$$

19. The non-transitory computer-readable storage medium of claim 13, wherein determining the plurality of statistics for the plurality of test documents comprises:
  obtaining a user classification for each of the plurality of test documents from a user;
  obtaining a system classification for each of the plurality of test documents from an information retrieval system; and
  calculating the plurality of statistics for the plurality of test documents based on the user classification for each of the plurality of test documents and the system classification for each of the plurality of test documents.

20. The non-transitory computer-readable storage medium of claim 13, wherein determining the plurality of statistics for the plurality of validation documents comprises:
  obtaining a user classification for each of the plurality of validation documents from a user;
  obtaining a system classification for each of the plurality of validation documents from an information retrieval system; and
  calculating the plurality of statistics for the plurality of validation documents based on the user classification for each of the plurality of validation documents and the system classification for each of the plurality of validation documents.

21. A system comprising:
  a memory; and
  a processing device coupled to the memory, wherein the processing device is to:
    determine a plurality of statistics for a plurality of validation documents;
    determine a number for a sample size of test documents in a plurality of test documents based on the plurality of statistics for the plurality of validation documents and an effectiveness measure of interest;
    determine a plurality of statistics for the plurality of test documents, wherein a number of test documents in the plurality of test documents is the number for the sample size of test documents;
    determine a number of false negatives for a corpus of documents based on the sample size and one or more of the plurality of statistics for the plurality of test documents, wherein a document of the corpus of documents is a false negative if classification of the document by a classification model is negative and classification of the document by a user is positive; and
    calculate an effectiveness of an information retrieval system on a corpus of documents based on the number of false negatives for the corpus of documents.

22. The system of claim 21, wherein to calculate the effectiveness of an information retrieval system, the processing device is to:
  calculate a number of true positives in the corpus of documents based on the number of test documents in the plurality of test documents, a size of the corpus of documents, a predetermined confidence level, and the plurality of statistics for the plurality of test documents;
calculate a number of false positives in the corpus of documents based on the number of test documents in the plurality of test documents, the size of the corpus of documents, the predetermined confidence level, and the plurality of statistics for the plurality of test documents;
calculate the number of false negatives in the corpus of documents based on the number of test documents in the plurality of test documents, the size of the corpus of documents, the predetermined confidence level, and the plurality of statistics for the plurality of test documents; and
calculate a plurality of effectiveness measures for the corpus of documents based on one or more of the number of true positives, the number of false positives, or the number of false negatives.

23. The system of claim 22, wherein calculating the number of true positives in the corpus of documents comprises applying a true positive number formula $$\widehat{TP} = \left(\frac{tp}{n}\right) \times N,$$

with a $(1-\alpha)\times 100\%$ confidence interval defined by a formula
$[(\widehat{p01} - Z0\sqrt{\widehat{\text{var}}(\widehat{p01})}) \times N, (\widehat{p01} + Z0\sqrt{\widehat{\text{var}}(\widehat{p01})}) \times N]$,
wherein $$\widehat{p01} = \left(\frac{tp + Z2}{n + Z4}\right),$$

wherein $$\widehat{\text{var}}(\widehat{p01}) = \frac{\widehat{p01}(1 - \widehat{p01})}{n + Z4} \times fpc,$$

wherein $$fpc = \frac{N - (n + Z4)}{N - 1},$$

wherein $Z0 = z_{1-\alpha/2}$,
wherein $Z4 = (Z0)^2 = (z_{1-\alpha/2})^2$,
wherein $$Z2 = \frac{Z4}{2} = \left(z_{1-\frac{\alpha}{2}}\right)^2 / 2,$$

wherein $z_{1-\alpha/2}$ is a $(1-\alpha/2)$ percentile of a standard normal distribution,
wherein $\alpha$ is an error percentile,
wherein $(1-\alpha)\times 100\%$ is the predetermined confidence level,
wherein tp is a number of true positives in the plurality of test documents,
wherein N is the size of the corpus of documents,
wherein n is the number of test documents,
wherein calculating the number of false positives comprises applying a false positive number formula $$\widehat{FP} = \left(\frac{fp}{n}\right) \times N,$$

with a $(1-\alpha)\times 100\%$ confidence interval defined by a formula
$[(\widehat{p02} - Z0\sqrt{\widehat{\text{var}}(\widehat{p02})}) \times N, (\widehat{p02} + Z0\sqrt{\widehat{\text{var}}(\widehat{p02})}) \times N]$,
wherein $$\widehat{p02} = \left(\frac{fp + Z2}{n + Z4}\right),$$

wherein $$\widehat{\text{var}}(\widehat{p02}) = \frac{\widehat{p02}(1 - \widehat{p02})}{n + Z4} \times fpc,$$

wherein fp is a number of false positives in the plurality of test documents,
wherein calculating the number of false negatives comprises applying a false negative number formula $$\widehat{FN} = \left(\frac{fn}{n}\right) \times N,$$

with a $(1-\alpha)\times 100\%$ confidence interval defined by a formula
$[(\widehat{p04} - Z0\sqrt{\widehat{\text{var}}(\widehat{p04})}) \times N, (\widehat{p04} + Z0\sqrt{\widehat{\text{var}}(\widehat{p04})}) \times N]$,
wherein $$\widehat{p04} = \left(\frac{fn + Z2}{n + Z4}\right),$$

wherein $$\widehat{\text{var}}(\widehat{p04}) = \frac{\widehat{p04}(1 - \widehat{p04})}{n + Z4} \times fpc,$$

and
wherein fn is a number of false negatives in the plurality of test documents.

24. The system of claim 22, wherein the plurality of effectiveness measures comprise at least one of: precision, recall, and F-measure, wherein the precision is calculated using a precision formula $$\widehat{\text{precision}} = \frac{1}{1 + \frac{FP}{TP}},$$

with a $(1-\alpha)\times 100\%$ precision confidence interval [$\widehat{\text{precision0}} - Z0\sqrt{\widehat{\text{var}}(\widehat{\text{precision0}})}$, $\widehat{\text{precision0}} + Z0\sqrt{\widehat{\text{var}}(\widehat{\text{precision0}})}$], wherein $$\widehat{precision0} = \frac{1}{1 + \frac{\widehat{FPo}}{\widehat{TPo}}},$$

wherein $$\widehat{var}(\widehat{precision0}) = \frac{\widehat{var}(\widehat{FP0}) \times \widehat{TP0}^3 + \widehat{var}(\widehat{TP0}) \times \widehat{FP0}^3 - 2 \times \widehat{TP0} \times \widehat{FP0} \times cov(\widehat{TP0}, \widehat{FP0})}{(\widehat{TP0}, \widehat{FP0})^4},$$

wherein $\widehat{TP0} = \widehat{p01} \times N$,
wherein $\widehat{FP0} = \widehat{p02} \times N$,
wherein $$\widehat{var}(\widehat{TP0}) = N^2 \times \frac{\widehat{p01}(1-\widehat{p01})}{n+Z4} \times fpc,$$

wherein $$\widehat{var}(\widehat{FP0}) = N^2 \times \frac{\widehat{p02}(1-\widehat{p02})}{n+Z4} \times fpc,$$

wherein $$cov(\widehat{TP0}, \widehat{FP0}) = N^2 \times \left(-\frac{\widehat{p01} \times \widehat{p02}}{n+Z4} \times fpc\right),$$

wherein $$\widehat{p01} = \left(\frac{tp+Z2}{n+Z4}\right),$$

wherein $$\widehat{p02} = \left(\frac{fp+Z2}{n+Z4}\right),$$

wherein $$fpc = \frac{N-(n+Z4)}{N-1},$$

wherein $Z0 = z_{1-\alpha/2}$,
wherein $Z4 = (Z0)^2 = (z_{1-\alpha/2})^2$,
wherein $$Z2 = \frac{Z4}{2} = \left(z_{1-\frac{\alpha}{2}}\right)^2 / 2,$$

wherein $z_{1-\alpha/2}$ is a $(1-\alpha/2)$ percentile of a standard normal distribution, wherein $\alpha$ is an error percentile,
wherein $(1-\alpha) \times 100\%$ is the predetermined effectiveness confidence level,
wherein tp is a number of true positives in the plurality of test documents,
wherein fp is a number of false positives in the plurality of test documents,
wherein N is the size of the corpus of documents,
wherein n is the number of test documents,
wherein the recall is calculated using a recall formula $$\widehat{recall} = \frac{1}{1 + \frac{\widehat{FN}}{\widehat{TP}}},$$

with a $(1-\alpha) \times 100\%$ recall confidence interval [$\widehat{recall0} - Z0 \sqrt{\widehat{var}(\widehat{recall0})}$, $\widehat{recall0} + Z0\sqrt{\widehat{var}(\widehat{recall0})}$],
wherein $$\widehat{recall0} = \frac{1}{1 + \frac{\widehat{FN0}}{\widehat{TP0}}},$$

wherein $$\widehat{var}(\widehat{recall0}) = \frac{\widehat{var}(\widehat{FN0}) \times \widehat{TP0}^3 + \widehat{var}(\widehat{TP0}) \times \widehat{FN0}^3 - 2 \times \widehat{TP0} \times \widehat{FN0} \times cov(\widehat{TP0}, \widehat{FN0})}{(\widehat{TP0} + \widehat{FN0})^4},$$

wherein $\widehat{FN0} = \widehat{p04} \times N$,
wherein $$\widehat{var}(\widehat{FN0}) = N^2 \times \frac{\widehat{p04}(1-\widehat{p04})}{n+Z4} \times fpc,$$

wherein $$cov(\widehat{TP0}, \widehat{FN0}) = N^2 \times \left(-\frac{\widehat{p01} \times \widehat{p04}}{n+Z4} \times fpc\right),$$

wherein $$\widehat{p04} = \left(\frac{fn+Z2}{n+Z4}\right),$$

wherein fn is a number of false negatives in the plurality of test documents,
wherein the F-measure is calculated using an F-measure formula $$\hat{F} = \frac{2}{\frac{1}{R} + \frac{1}{F}},$$

with a $(1-\alpha) \times 100\%$ F-measure confidence interval [$\widehat{F0} - Z0\sqrt{\widehat{\text{var}}(\widehat{F0})}, \widehat{F0} + Z0\sqrt{\widehat{\text{var}}(\widehat{F0})}$], wherein $\hat{P} = \widehat{\text{precision}}$, wherein $\widehat{P0} = \widehat{\text{precision0}}$, wherein $\hat{R} = \widehat{\text{recall}}$, wherein $\widehat{R0} = \widehat{\text{recall0}}$, wherein $$\widehat{F0} = \frac{2}{\frac{1}{\widehat{R0}} + \frac{1}{\widehat{P0}}},$$

wherein $$\widehat{\text{var}}(\widehat{F0}) = (\widehat{F0})^2 \left( \frac{\widehat{\text{var}}\left(\frac{1}{\widehat{R0}} + \frac{1}{\widehat{P0}}\right)}{\left(\frac{1}{\widehat{R0}} + \frac{1}{\widehat{P0}}\right)^2} \right),$$

wherein $$\widehat{\text{var}}\left(\frac{1}{\widehat{R0}} + \frac{1}{\widehat{P0}}\right) = \left(\frac{1}{\widehat{R0}}\right)^2 \left(\frac{\widehat{\text{var}}(\widehat{R0})}{\widehat{R0}^2}\right) + \left(\frac{1}{\widehat{P0}}\right)^2 \left(\frac{\widehat{\text{var}}(\widehat{P0})}{\widehat{P0}^2}\right) + 2 \times \text{cov}\left(\frac{1}{\widehat{P0}}, \frac{1}{\widehat{R0}}\right),$$

and wherein $$\text{cov}\left(\frac{1}{\widehat{P0}} \times \frac{1}{\widehat{R0}}\right) = \frac{fpc}{n + Z4} \times \frac{\hat{p}02 \times \hat{p}04}{(\widehat{p01})^2}.$$

25. The system of claim 21, wherein to determine the number for the sample size of test documents based on the plurality of statistics for the plurality of validation documents and the effectiveness measure of interest comprises the processing device to:

apply a formula using the plurality of statistics for the plurality of validation documents and the effectiveness measure of interest.

26. The system of claim 25, wherein when the effectiveness measure of interest is the F-measure, the formula for the number of test documents is:

$$n = \frac{(N - Z4) \times n0 - Z4 \times (Z4 - 1)}{N + n0 + Z4 - 1},$$

wherein $$n0 = \frac{4A}{B \times C} - Z4,$$

wherein $$A = \frac{\hat{p}04 \times (1 - \hat{p}04) \times (\hat{p}01)^2 + \hat{p}01 \times (1 - \hat{p}01) \times (\hat{p}04)^2 +}{(\widehat{p01})^4} + \frac{\hat{p}02 \times (1 - \hat{p}02) \times (\widehat{p01})^2 + \hat{p}01 \times (1 - \hat{p}01) \times (\hat{p}02)^2}{(\widehat{p01})^4} + \frac{Z \times (\hat{p}01)^2 \times (\hat{p}02)^2 + 2 \times (\hat{p}01)^2 \times (\hat{p}04)^2 + 2 \times \hat{p}01 \times \hat{p}02 \times \hat{p}04}{(\widehat{p01})^4},$$

wherein $$B = \left(\frac{\hat{p}02}{\widehat{p01}} + \frac{\hat{p}04}{\widehat{p01}} + 2\right)^4,$$

wherein $C = (W/(2 \times Z0))^2$, wherein $$\widehat{p01} = \left(\frac{tp\_v + Z2}{n\_v + Z4}\right)$$

is a center of a population true positive rate confidence interval, wherein $$\widehat{p02} = \left(\frac{fp\_v + Z2}{n\_v + Z4}\right)$$

is a center of a population false positive rate confidence interval, wherein $$\widehat{p04} = \left(\frac{fn\_v + Z2}{n\_v + Z4}\right)$$

is a center of a population false negative rate confidence interval, wherein $Z0 = z_{1-\alpha/2}$, wherein $Z4 = (Z0)^2 = (z_{1-\alpha/2})^2$, wherein $$Z2 = \frac{Z4}{2} = \left(z_{1-\frac{\alpha}{2}}\right)^2 / 2,$$

wherein $z_{1-\alpha/2}$ is a $(1-\alpha/2)$ percentile of a standard normal distribution, wherein $\alpha$ is an error percentile, wherein $(1-\alpha) \times 100\%$ is the predetermined effectiveness confidence level, wherein W is a confidence interval width of the effectiveness measure of interest, wherein tp_v is a number of true positives in the plurality of validation documents, wherein fp_v is a number of false positives in the plurality of validation documents, wherein fn_v is a number of false negatives in the plurality of validation documents, wherein N is the size of the corpus of documents, wherein n_v is a number of documents in the plurality of validation documents, wherein when the effectiveness measure of interest is the recall, the formula for the number of test documents is $$n = \frac{(N-Z4) \times n1 - Z4 \times (Z4-1)}{N + n1 + Z4 - 1},$$

wherein $$n1 = \frac{A1}{c} - Z4,$$

wherein $$A1 = \frac{\bar{p}04 \times (1-\bar{p}04) \times (\bar{p}01)^2 + \bar{p}01 \times (1-\bar{p}01) \times (\bar{p}04)^2 + 2 \times (\bar{p}01)^2 \times (\bar{p}04)^2}{(\bar{p}01 + \bar{p}04)^4},$$

wherein when the effectiveness measure of interest is the precision, the formula for the number of test documents is $$n = \frac{(N-Z4) \times n2 - Z4 \times (Z4-1)}{N + n2 + Z4 - 1},$$

wherein $$n2 = \frac{A2}{c} - Z4,$$

and wherein $$A2 = \frac{\bar{p}02 \times (1-\bar{p}02) \times (\bar{p}01)^2 + \bar{p}01 \times (1-\bar{p}01) \times (\bar{p}02)^2 + 2 \times (\bar{p}01)^2 \times (\bar{p}02)^2}{(\bar{p}01 + \bar{p}02)^4}.$$

* * * * *